(12) United States Patent
Miyamoto et al.

(10) Patent No.: US 9,157,984 B2
(45) Date of Patent: Oct. 13, 2015

(54) POSITION DETECTION SYSTEM, TRANSMISSION DEVICE AND RECEPTION DEVICE, AND POSITION DETECTION METHOD

(75) Inventors: Junichi Miyamoto, Tokyo (JP); Hiroshi Kajitani, Tokyo (JP)

(73) Assignee: NEC Corporation, Tokyo (JP)

(*) Notice: Subject to any disclaimer, the term of this patent is extended or adjusted under 35 U.S.C. 154(b) by 947 days.

(21) Appl. No.: 13/383,522

(22) PCT Filed: Jul. 2, 2010

(86) PCT No.: PCT/JP2010/061318
§ 371 (c)(1),
(2), (4) Date: Jan. 11, 2012

(87) PCT Pub. No.: WO2011/007685
PCT Pub. Date: Jan. 20, 2011

(65) Prior Publication Data
US 2012/0113753 A1    May 10, 2012

(30) Foreign Application Priority Data

Jul. 14, 2009    (JP) .................................. 2009-165412

(51) Int. Cl.
*G06F 3/03*    (2006.01)
*G01S 5/30*    (2006.01)
(Continued)

(52) U.S. Cl.
CPC . *G01S 5/30* (2013.01); *G01S 11/16* (2013.01); *G06F 3/03545* (2013.01); *G06F 3/043* (2013.01); *G06F 3/0433* (2013.01)

(58) Field of Classification Search
CPC ........... G01S 15/06; G01S 5/30; G01S 11/16; G06F 15/00; G06F 3/033; G06F 3/03545; G06F 3/043; G06F 3/0433
See application file for complete search history.

(56) References Cited

U.S. PATENT DOCUMENTS 5,272,923 A * 12/1993 Wadaka et al. ................. 73/602
6,118,205 A    9/2000 Wood et al.
(Continued)

FOREIGN PATENT DOCUMENTS

JP    2004-199560    7/2004
JP    3876370    1/2007
(Continued)

OTHER PUBLICATIONS

International Search Report, PCT/JP2010/061318, Oct. 5, 2010.
(Continued)

*Primary Examiner* — Isam Alsomiri
*Assistant Examiner* — Hovhannes Baghdasaryan
(74) *Attorney, Agent, or Firm* — Young & Thompson

(57) ABSTRACT

A position detection system, includes at least one moving body (MB) including a transmission device simultaneously emitting a trigger signal indicating transmission timing and an ultrasonic signal obtained by modulating a signal of a frequency as a reference by pseudo random sequence data having high self-correlativity, and a reception device detecting MB position. The reception device includes ultrasonic reception units, a unit calculating a correlation value between a waveform of the ultrasonic signal and a model waveform of the pseudo random sequence, a unit subjecting the waveform of the ultrasonic signal and the model waveform to calculate a correlation value between the two waveforms, a unit calculating a propagation time of each ultrasonic to arrive at each of the ultrasonic reception units from trigger signal reception to correlation peak detection, and a unit calculating MB position from the ultrasonic propagation time and the interval length between the ultrasonic reception units.

18 Claims, 14 Drawing Sheets

(51) Int. Cl.
  *G01S 11/16* (2006.01)
  *G06F 3/0354* (2013.01)
  *G06F 3/043* (2006.01)

(56) References Cited

U.S. PATENT DOCUMENTS

| | | | |
|---|---|---|---|
| 6,434,085 B1* | 8/2002 | Nedwell | 367/100 |
| 2008/0304361 A1* | 12/2008 | Peng et al. | 367/127 |
| 2009/0010103 A1* | 1/2009 | Sallas et al. | 367/41 |
| 2009/0145232 A1* | 6/2009 | Suginouchi et al. | 73/597 |
| 2009/0190441 A1* | 7/2009 | Zhao et al. | 367/128 |
| 2010/0286949 A1* | 11/2010 | Miyamoto et al. | 702/150 |
| 2011/0116345 A1* | 5/2011 | Miyamoto et al. | 367/124 |
| 2011/0261654 A1* | 10/2011 | Miyamoto et al. | 367/125 |

FOREIGN PATENT DOCUMENTS

| | | | |
|---|---|---|---|
| WO | 2009028591 | 3/2009 | |
| WO | 2009028680 | 3/2009 | |
| WO | WO 2009/028591 | 3/2009 | |
| WO | WO 2009/028680 | 3/2009 | |
| WO | WO/2009/084490 * | 7/2009 | 367/128 |

OTHER PUBLICATIONS

Hiroshi Kashiwagi, "M-sequence and It's Applications", published by Shokodo, Mar. 25, 1996.

JP Office Action dated Feb. 12, 2014, with English Translation; Application No. 2011-522782.

* cited by examiner

POSITION DETECTION SYSTEM, TRANSMISSION DEVICE AND RECEPTION DEVICE, AND POSITION DETECTION METHOD

TECHNICAL FIELD

The present invention relates to a position detection system which detects a position of a moving body by using an ultrasonic signal and, more particularly, a position detection system, a transmission device, a reception device, and a position detection method which enable positions of a plurality of moving bodies to be precisely and stably detected.

BACKGROUND ART

Recited in Patent Literature 1 as one example of systems which measure a propagation time of ultrasonic to detect a position of a moving body is an electronic pen system. According to the position detection method which uses a propagation time of ultrasonic as recited in Patent Literature 1, an electronic pen as a transmitter simultaneously transmits an ultrasonic signal and a trigger signal in a fixed cycle to measure a time from a time point of reception of the trigger signal by a receiver and software until a time point of reception of the ultrasonic signal transmitted from the electronic pen as a propagation time of ultrasonic and specify a position of the electronic pen by using the propagation time.

The ultrasonic signal transmitted from the electronic pen, which is a signal whose waveform has such a burst shape as shown in FIG. 23, is transmitted with the same waveform in each transmission cycle. The receiver first receives a trigger signal and then receives an ultrasonic signal arriving with a delay according to a propagation distance as shown in FIG. 24.

Further recited in Patent Literature 2, as another example of position detection by measuring a propagation time of ultrasonic transmitted from a plurality of emission sources, is an ultrasonic type coordinate input device which enables use of a plurality of pens at the same time. In the position detection method using a propagation time of ultrasonic recited in Patent Literature 2, a fixed body (receiver) transmits an electromagnetic wave signal such as an infrared signal including ID information and a moving body (pen) side transmits ultrasonic only when receiving an electromagnetic wave signal relevant to its own ID. The interval of transmission of an electromagnetic wave signal including ID information is set to be longer than a time of moving of ultrasonic within the maximum range of coordinate input.

As shown in FIG. 25, with a sampling cycle T for measuring a coordinate, a time assigned to one pen will be T/n which is determined by a relationship with a drawing range. In a case where T is 10 ms and the drawing range is A4 size, a propagation distance of ultrasonic will be 350 mm at the maximum and a propagation time will be on the order of 1 ms, so that when T/n is set to be 2 ms taking into consideration a margin to prevent the time from falling in a time frame of other ID, five pens can be used simultaneously at the maximum.

On the other hand, assuming the use of an electronic pen on a projection screen of a projector, a screen size on the order of 80 inches will be required as a drawing range in practice, so that a propagation distance of ultrasonic transmitted from the electronic pen to reach a receiver will be about 2 m at the maximum and a propagation time will be on the order of 7 ms.

One example of methods of calculating a propagation time of a sound wave is recited in Patent Literature 3. The sound wave propagation time calculation method recited in Patent Literature 3 is a method in which with an M sequence phase-modulated wave used as a transmission wave, a receiver receives an M sequence phase-modulated wave transmitted by a transmitter and a matched filter obtains correlation between a reception signal and a transmission signal to detect a peak of an output of the matched filter and calculate a propagation time of a sound wave by a peak time.

Patent Literature 1: U.S. Pat. No. 6,118,205
Patent Literature 2: Japanese Patent Laying-Open No. 2004-199560
Patent Literature 3: Japanese Patent No. 3876370
Non-Patent Literature 1: Hiroshi Kashiwagi, "M-sequence and Its Applications", published by Shokodo, Mar. 25, 1996.

In a case of measuring a propagation time of ultrasonic from moving bodies as a plurality of detection targets, when an ultrasonic detection range is large, a propagation time of ultrasonic from the most distant point will be longer to require the above-described T/n to be set to be longer. The detection interval T, however, cannot be set to be unnecessarily long when, for example, preventing collision of bodies or reproducing handwriting by an electronic pen. When the most distant point locates as far as 2 m away as in a case where an electronic pen is used on a projection screen of a projector, the propagation time will be on the order of 7 ms, so that only one electronic pen can be used taking a margin into consideration.

Thus, according to the method recited in Patent Literature 1, when a propagation distance of ultrasonic is long, it is so difficult to detect positions of a plurality of moving bodies (electronic pens) precisely and stably that the pens cannot be used.

According to the method recited in Patent Literature 2, because as an ultrasonic transmission signal, the same signal waveform is assumed for a plurality of pens, detection of an arrival point of ultrasonic from different pens might be affected. A receiver, for example, receives a reflected wave of ultrasonic transmitted first which is propagated through a long distance prior to a direct wave transmitted from a different pen having a next ID and erroneously recognizes the first received reflected wave as a direct wave to erroneously measure an arrival time, so that it is impossible to calculate an accurate position of an electronic pen.

Furthermore, since a wave of a burst shape is assumed for an ultrasonic transmission signal, a configuration of a composite wave will change according to overlapping between a direct wave and a reflected wave, which makes it difficult to detect an arrival point of a direct wave arriving first and impossible to detect an accurate position of an electronic pen as a moving body.

A method of calculating a propagation time of a sound wave by using an M sequence phase-modulated wave as a transmission wave such as the method recited in Patent Literature 3 is a method of measuring a propagation time of a sound wave on a different propagation path on which a transmitter/receiver is disposed in advance and measuring a flow velocity of fluid flowing through a target object on which a transmitter/receiver is disposed. When a plurality of transmitters (moving bodies) transmit ultrasonic simultaneously, it is impossible to identify the plurality of transmitters and measure a propagation time of ultrasonic from each transmitter, that is, to detect positions of the plurality of moving bodies precisely and stably.

OBJECT OF THE PRESENT INVENTION

An object of the present invention is to solve the above-described problem and provide a position detection system, a transmission device and a reception device, and a position detection method which enable, when a plurality of moving bodies are used simultaneously, a position of each moving body to be detected accurately and stably.

Another object of the present invention is to provide a position detection system, a transmission device and a reception device, and a position detection method which enable, even when a propagation distance of an ultrasonic signal is long, positions of a plurality of moving bodies to be detected accurately and stably.

SUMMARY

According to a first exemplary aspect of the invention, a position detection system, includes at least one moving body including a transmission device which simultaneously sends out a trigger signal indicative of transmission timing and an ultrasonic signal obtained by modulating a signal of a frequency as a reference by pseudo random sequence data having high self-correlativity, and a reception device which receives the trigger signal and the ultrasonic signal to detect a position of the moving body, wherein the reception device comprises at least two ultrasonic reception units provided at a predetermined interval which receive the ultrasonic signal, a unit which calculates a correlation value between a waveform of the ultrasonic signal and a model waveform of the pseudo random sequence determined in advance according to the moving body, a unit which subjects the waveform of the ultrasonic signal and the model waveform of the pseudo random sequence determined in advance according to the moving body to filtering to calculate a correlation value between the two waveforms, a unit which detects a first peak of any the correlation value calculated and calculates a time of propagation of each ultrasonic to arrive at each of the two ultrasonic reception units from a time point of reception of the trigger signal and a time point of detection of the correlation peak, and a unit which calculates a position of the moving body based on the ultrasonic propagation time calculated and the interval length between the ultrasonic reception units, and wherein as the pseudo random sequence, a different sequence whose cross-correlativity is low is used.

According to a second exemplary aspect of the invention, a position detection system, includes at least one moving body including a transmission device which simultaneously sends out a trigger signal indicative of transmission timing and an ultrasonic signal obtained by modulating a signal of a frequency as a reference by pseudo random sequence data having high self-correlativity and, after modulating, limiting a band of the modulated signal, and a reception device which receives the trigger signal and the ultrasonic signal to detect a position of the moving body, wherein the reception device comprises at least two ultrasonic reception units provided at a predetermined interval which receive the ultrasonic signal, a unit which subjects a waveform of the ultrasonic signal and a model waveform of the pseudo random sequence determined in advance according to the moving body to filtering to calculate a correlation value between the two waveforms, a unit which detects a first peak of the correlation value calculated and calculates a time of propagation of each ultrasonic to arrive at each of the two ultrasonic reception units from a time point of reception of the trigger signal and a time point of detection of the correlation peak, and a unit which calculates a position of the moving body based on the ultrasonic propagation time calculated and the interval length between the ultrasonic reception units, and wherein as the pseudo random sequence, a different sequence whose cross-correlativity is low is used.

According to a third exemplary aspect of the invention, a transmission device of a position detection system which receives, at a reception device, an ultrasonic signal transmitted from the transmission device to detect a position of the transmission device, comprising:

a trigger signal transmission unit which sends out a trigger signal indicative of transmission timing; and an ultrasonic transmission unit which sends out an ultrasonic signal obtained by modulating a signal of a frequency as a reference by a pseudo random signal having high self-correlativity in synchronization with transmission of the trigger signal, wherein as a sequence of a pseudo random signal of the ultrasonic signal, a different sequence whose cross-correlativity is low is used.

According to a fourth exemplary aspect of the invention, a transmission device of a position detection system which receives, at a reception device, an ultrasonic signal transmitted from the transmission device to detect a position of the transmission device, comprising:

a trigger signal transmission unit which sends out a trigger signal indicative of transmission timing; and an ultrasonic transmission unit which sends out an ultrasonic signal obtained by modulating a signal of a frequency as a reference by a pseudo random signal having high self-correlativity and, after modulating, limiting a band of the modulated signal in synchronization with transmission of the trigger signal, wherein as a sequence of a pseudo random signal of the ultrasonic signal, a different sequence whose cross-correlativity is low is used.

According to a fifth exemplary aspect of the invention, a reception device of a position detection system which receives, at the reception device, an ultrasonic signal transmitted from a transmission device to detect a position of the transmission device, comprising:

a trigger signal reception unit which receives a trigger signal indicative of transmission timing that is transmitted from the transmission device;

at least two ultrasonic reception units provided at a predetermined interval which receive the ultrasonic signal that is obtained by modulating a signal of a frequency as a reference by a pseudo random signal having high self-correlativity and, after modulating, limiting a band of the modulated signal and that is transmitted from the transmission device in synchronization with the trigger signal;

a unit which calculates a correlation value between a waveform of the ultrasonic signal and a model waveform determined in advance according to the moving body;

a unit which subjects the waveform of the ultrasonic signal and the model waveform of the pseudo random sequence determined in advance according to the moving body to filtering to calculate a correlation value between the two waveforms;

a unit which detects a first peak of any the correlation value calculated and calculates a time of propagation of each ultrasonic to arrive at each of the two ultrasonic reception units from a time point of reception of the trigger signal and a time point of detection of the correlation peak; and a unit which calculates a position of the moving body based on the ultrasonic propagation time calculated and the interval length between the ultrasonic reception units, wherein as a sequence of a pseudo random signal of the ultrasonic signal, a different sequence whose cross-correlativity is low is used.

According to a sixth exemplary aspect of the invention, a reception device of a position detection system which receives, at the reception device, an ultrasonic signal transmitted from a transmission device to detect a position of the transmission device, comprising:

a trigger signal reception unit which receives a trigger signal indicative of transmission timing transmitted from the transmission device;

at least two ultrasonic reception units provided at a predetermined interval which receive the ultrasonic signal that is obtained by modulating a signal of a frequency as a reference by a pseudo random signal having high self-correlativity and after modulating, limiting a band of the modulated signal and that is transmitted from the transmission device in synchronization with the trigger signal;

a unit which subjects a waveform of the ultrasonic signal and a model waveform of the pseudo random sequence determined in advance according to the moving body to filtering to calculate a correlation value between the two waveforms;

a unit which detects a first peak of the correlation value calculated and calculates a time of propagation of each ultrasonic to arrive at each of the two ultrasonic reception units from a time point of reception of the trigger signal and a time point of detection of the correlation peak; and a unit which calculates a position of the moving body based on the ultrasonic propagation time calculated and the interval length between the ultrasonic reception units, wherein as a sequence of a pseudo random signal of the ultrasonic signal, a different sequence whose cross-correlativity is low is used.

According to a seventh exemplary aspect of the invention, a position detection method, wherein at least one transmission device executes the step of simultaneously transmitting a trigger signal indicative of transmission timing and an ultrasonic signal obtained by modulating a signal of a frequency as a reference by a pseudo random signal having high self-correlativity, a reception device which receives the trigger signal and the ultrasonic signal to detect a position of the moving body executes the steps of:

receiving the ultrasonic signal by at least two ultrasonic reception units provided at a predetermined interval;

calculating a correlation value between a waveform of the ultrasonic signal and a model waveform determined in advance according to the moving body;

subjecting the waveform of the ultrasonic signal and the model waveform determined in advance according to the moving body to filtering to calculate a correlation value between the two waveforms;

detecting a first peak of any the correlation value calculated and calculating a time of propagation of each ultrasonic to arrive at each of the two ultrasonic reception units from a time point of reception of the trigger signal and a time point of detection of the correlation peak; and calculating a position of the moving body based on the ultrasonic propagation time calculated and the interval length between the ultrasonic reception units, wherein as a sequence of a pseudo random signal of the ultrasonic signal sent by the transmission device, a different sequence whose cross-correlativity is low is used.

According to a eighth exemplary aspect of the invention, a position detection method, wherein at least one transmission device executes the step of:

simultaneously transmitting a trigger signal indicative of transmission timing and an ultrasonic signal obtained by modulating a signal of a frequency as a reference by a pseudo random signal having high self-correlativity and, after modulating, limiting a band of the modulated signal;

a reception device which receives the trigger signal and the ultrasonic signal to detect a position of the moving body executes the steps of:

receiving the ultrasonic signal by at least two ultrasonic reception units provided at a predetermined interval;

subjecting a waveform of the ultrasonic signal and a model waveform determined in advance according to the moving body to filtering to calculate a correlation value between the two waveforms;

detecting a first peak of the correlation value calculated and calculating a time of propagation of each ultrasonic to arrive at each of the two ultrasonic reception units from a time point of reception of the trigger signal and a time point of detection of the correlation peak; and calculating a position of the moving body based on the ultrasonic propagation time calculated and the interval length between the ultrasonic reception units, wherein as a pseudo random signal sequence of the ultrasonic signal sent by the transmission device, a different sequence whose cross-correlativity is low is used.

According to a ninth exemplary aspect of the invention, a propagation time determination method, wherein at least one transmission device executes the step of simultaneously transmitting a trigger signal indicative of transmission timing and an ultrasonic signal obtained by modulating a signal of a frequency as a reference by a pseudo random signal having high self-correlativity, a reception device which receives the trigger signal and the ultrasonic signal to detect a position of the moving body executes the steps of:

receiving the ultrasonic signal by at least two ultrasonic reception units provided at a predetermined interval;

calculating a correlation value between a waveform of the ultrasonic signal and a model waveform determined in advance according to the moving body;

subjecting the waveform of the ultrasonic signal and the model waveform determined in advance according to the moving body to filtering to calculate a correlation value between the two waveforms; and detecting a first peak of any the correlation value calculated and calculating a time of propagation of each ultrasonic to arrive at each of the two ultrasonic reception units from a time point of reception of the trigger signal and a time point of detection of the correlation peak, wherein as a sequence of a pseudo random signal of the ultrasonic signal sent by the transmission device, a different sequence whose cross-correlativity is low is used.

According to a tenth exemplary aspect of the invention, a propagation time determination method, wherein at least one transmission device executes the step of:

simultaneously transmitting a trigger signal indicative of transmission timing and an ultrasonic signal obtained by modulating a signal of a frequency as a reference by a pseudo random signal having high self-correlativity and, after modulating, limiting a band of the modulated signal, a reception device which receives the trigger signal and the ultrasonic signal to detect a position of the moving body executes the steps of:

receiving the ultrasonic signal by at least two ultrasonic reception units provided at a predetermined interval;

subjecting a waveform of the ultrasonic signal and a model waveform determined in advance according to the moving body to filtering to calculate a correlation value between the two waveforms; and detecting a first peak of the correlation value calculated and calculating a time of propagation of each ultrasonic to arrive at each of the two ultrasonic reception units from a time point of reception of the trigger signal and a time point of detection of the correlation peak, wherein as a pseudo random signal sequence of the ultrasonic signal sent by the transmission device, a different sequence whose cross-correlativity is low is used.

When a plurality of moving bodies are used simultaneously, the present invention enables a position of each moving body to be detected accurately and stably.

EXEMPLARY EMBODIMENT

Next, exemplary embodiments of the present invention will be detailed with reference to the drawings.
(First Exemplary Embodiment)

Figure 1:
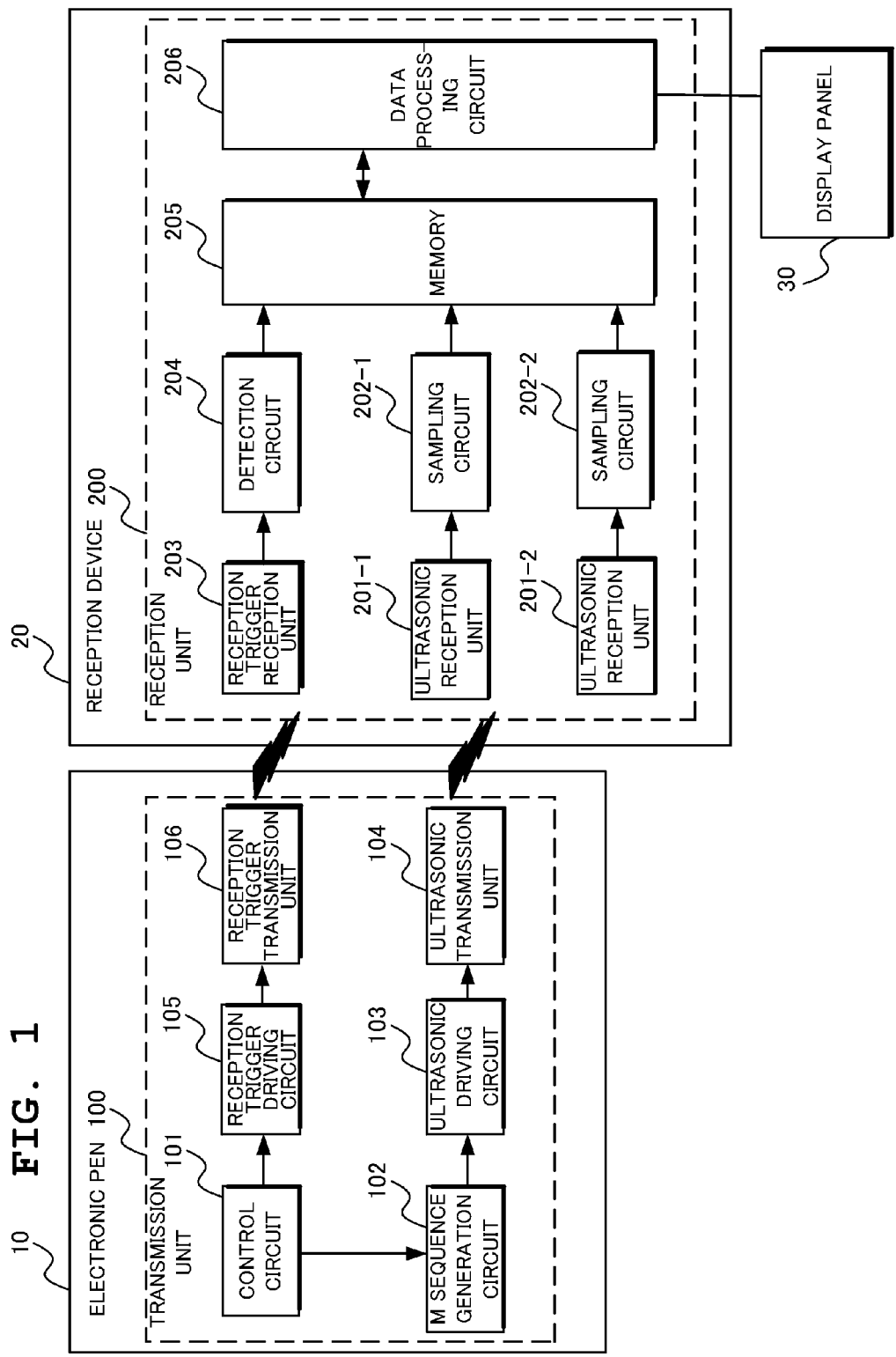
FIG. 1 is a block diagram showing a structure of an electronic pen system to which a position detection system according to a first exemplary embodiment of the present invention is applied.

FIG. 1 is a block diagram showing a structure of a position detection system according to a first exemplary embodiment of the present invention. In the following exemplary embodiment, description will be made of a case where a position detection system according to the present invention is applied to an electronic pen system.

In FIG. 1, the position detection system according to the first exemplary embodiment of the present invention comprises an electronic pen 10 equipped with a transmission unit 100, a reception device 20 disposed at a predetermined position apart from the electronic pen 10, and a display panel 30 which displays a locus drawn by the electronic pen 10. The electronic pen 10 is used on the display panel 30. The display panel 30 may be a projection screen projected by a projector.

The transmission unit 100 of the electronic pen 10 comprises a control circuit 101, an M sequence generation circuit 102, an ultrasonic driving circuit 103, an ultrasonic transmission unit 104, a reception trigger driving circuit 105 and a reception trigger transmission unit 106.

The M sequence generation circuit 102 has a function of generating a coded bit string of an M sequence. The M sequence is a sequence generated by defining a characteristic polynomial and an initial condition. Details of an M sequence are described in, for example, Hiroshi Kashiwagi, "M-sequence and Its Applications", Mar. 25, 1996, Shokodo (Non-Patent Literature 1).

The control circuit 101 outputs a predetermined M sequence characteristic polynomial and an initial condition to the M sequence generation circuit 102. The M sequence generation circuit 102 generates a coded bit string of the M sequence (M sequence data) according to the characteristic polynomial and the initial condition received from the control circuit 101.

The ultrasonic driving circuit 103 generates and outputs a driving signal for modulating ultrasonic based on the M sequence data generated by the M sequence generation circuit 102. The ultrasonic transmission unit 104 sends out into space an ultrasonic signal which is M-sequence modulated by the driving signal from the ultrasonic driving circuit 103.

Used as a method of modulating an ultrasonic signal by the ultrasonic transmission unit 104 is, for example, a phase modulation method.

In a case, for example, where a data string is used whose sequence length generated by such quartic characteristic polynomial as $f_1(x)=x^4+x+1$ is 15 bits, 15 different M sequence data whose data arrangement is circularly shifted are generated by changing the initial condition. When another quartic characteristic polynomial as $f_2(x)=x^4+x^3+1$ is used, M sequence data whose sequence is different from the above-described M sequence data is generated.

Figure 2:
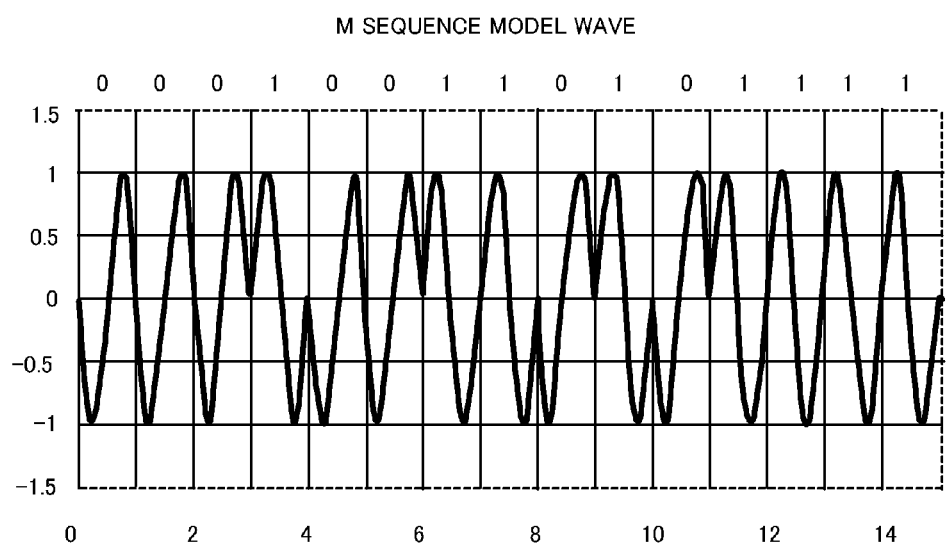
FIG. 2 is a diagram showing an example of an M sequence model waveform generated by a reception processing device according to the first exemplary embodiment of the present invention.

FIG. 2 shows an example of an M sequence model waveform of ultrasonic whose phase is modulated by M sequence data generated by the above-described characteristic polynomial as f1(x). In this example, each one bit of the 15-bit M sequence data "000100110101111" is set to correspond to one cycle of a basic wave. A bit "0" has an inverted phase and a bit "1" has a forward phase, and a modulated wave has a length equivalent to 15 cycles of the basic wave.

On the other hand, the control circuit 101 outputs a signal instructing the reception trigger driving circuit 105 to generate a trigger signal. The reception trigger driving circuit 105 generates a reception trigger driving signal based on the instruction signal from the control circuit 101.

The reception trigger transmission unit 106 is driven by a reception trigger driving signal from the reception trigger driving circuit 105 in synchronization with transmission timing of an ultrasonic signal from the ultrasonic transmission unit 104 to send a trigger signal into space. Used as the trigger signal is an infrared signal which is an electromagnetic wave signal, for example.

The trigger signal transmitted from the reception trigger transmission unit 106 is set to be a signal which allows each electronic pen 10 to be unitarily identified. When a plurality of electronic pens 10 are used, used as a trigger signal is a signal whose band is divided so as to prevent overlapping for each electronic pen 10.

The reception device 20 comprises a reception unit 200 including ultrasonic reception units 201-1 and 201-2, sampling circuits 202-1 and 202-2, a reception trigger reception unit 203, a reception trigger detection circuit 204, a memory 205 and a data processing circuit 206.

The ultrasonic reception units 201-1 and 202-2, which are disposed apart from each other with a predetermined interval length provided therebetween, receive an ultrasonic signal transmitted from the electronic pen 10 and convert the same into an electric signal.

The sampling circuits 202-1 and 202-2 sample an electric signal output from the ultrasonic reception units 201-1 and 201-2 at fixed intervals and sequentially store the same in the memory 205.

The reception trigger reception unit 203 receives a trigger signal from the electronic pen 10 and converts the trigger signal into an electric signal to output the signal as a trigger pulse. Upon detecting a trigger pulse from the reception trigger reception unit 203, the reception trigger detection circuit 204 stores a detection time (arrival time) of the trigger pulse in the memory 205 as trigger detection time data.

The data processing circuit 206 executes, as required, filtering of an ultrasonic signal waveform received at each of the ultrasonic reception units 201-1 and 201-2 which waveform is stored in the memory 205 and stores the obtained waveform in the memory 205 as an ultrasonic signal waveform. The data processing circuit 206 reads the same M sequence initial condition as that of the transmission unit 100 from the memory 205 and uses a characteristic polynomial set in advance to generate a model waveform of an ultrasonic signal transmitted, and execute processing of correlating the model waveform and an ultrasonic signal waveform stored in the memory 205. The data processing unit 206 sequentially stores a correlation value obtained by the correlation processing in the memory 205 for each of the ultrasonic signal waveforms received at the ultrasonic reception units 201-1 and 201-2.

In addition, upon detecting a leading peak of a correlation value stored in the memory 205, with respect to each ultrasonic signal received by each of the ultrasonic reception units 201-1 and 201-2, the data processing circuit 206 calculates a lapse of time from an arrival time of a trigger pulse until a time when the peak is detected, that is, a propagation time of the ultrasonic signal arriving at the reception device 20 from the electronic pen 10.

Furthermore, based on a propagation time of an ultrasonic signal arriving at the reception device 20 from the electronic pen 10 which is calculated for each ultrasonic signal received by each of the ultrasonic reception units 201-1 and 201-2 and the interval length between the ultrasonic reception units 201-1 and 201-2, the data processing circuit 206 calculates a position of the electronic pen 10 on the display panel 30.

As described above, it is possible to precisely detect a position of the electronic pen 10 by the principle of trigonometrical survey based on the propagation time of ultrasonic signals received at the two ultrasonic reception units 201-1 and 201-2 of the reception device 20 and the interval length between the ultrasonic reception units 201-1 and 201-2.

Also assume that different M sequence data is assigned to each of a plurality of electronic pens 10 existing. Different M sequence data will have a lower cross-correlation value and the same M sequence data will have a higher self-correlation value. Further, in order to improve identification, assume that a fundamental frequency as of before modulation of ultrasonic is different from each other for use for each electronic pen 10. Executing processing of correlating an ultrasonic waveform with an M-sequence model waveform to be detected will result in detecting an arrival point of ultrasonic as a peak of a correlation value of the M sequence data in question.

The position of the electronic pen 10 and a display position within a drawing range of the display panel 30 are correlated in advance. A switch which turns on in linkage with press of the display panel 30 is disposed at the tip of the electronic pen 10. At the time of drawing, while the switch of the electronic pen 10 is on by the pressing of the display panel 30, repetitious transmission of a trigger signal and an ultrasonic signal from the electronic pen 10 in a fixed cycle enables loci of a plurality of electronic pens 10 to be drawn on the display panel 30 with high precision.

(Description of Operation of the First Exemplary Embodiment)

Figure 3:
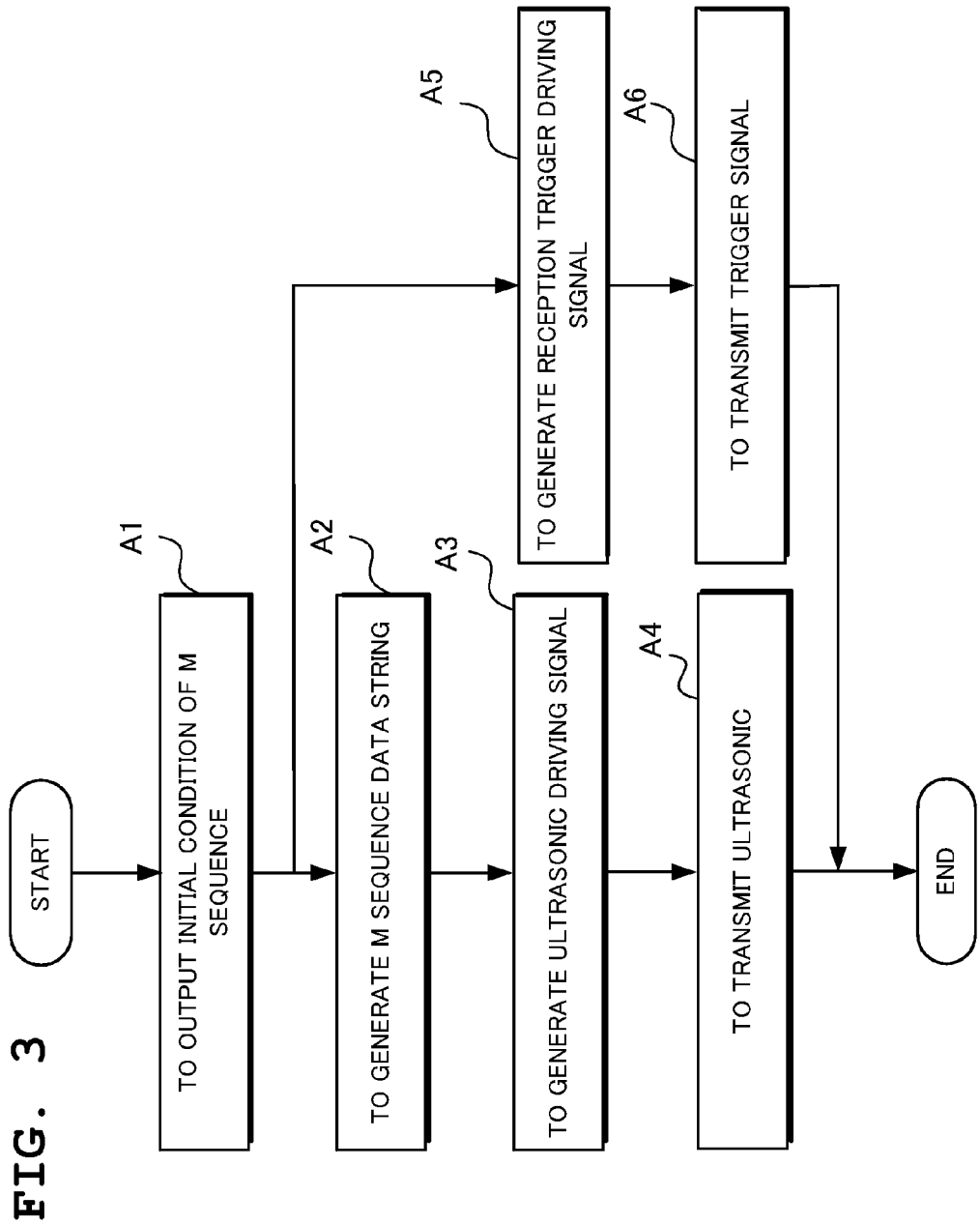
FIG. 3 is a flow chart for use in explaining operation of the electronic pen according to the first exemplary embodiment of the present invention.

Next, with reference to the flow chart of FIG. 3, description will be made of operation by the transmission unit 100 of the electronic pen 10. During operation, the electronic pen 10 repeats the following operation in a fixed cycle.

First, when the electronic pen 10 starts operation, the control circuit 101 outputs an initial condition of an M sequence characteristic polynomial set in advance to the M sequence generation circuit 102 (Step A1).

The M sequence generation circuit 102 generates M sequence data based on the initial condition obtained from the control circuit 101 (Step A2) and supplies the same to the ultrasonic driving circuit 103. The ultrasonic driving circuit 103 generates and outputs a driving signal for modulating ultrasonic of a fundamental frequency set in advance based on the M sequence data generated by the M sequence generation circuit 102 (Step A3).

When the driving signal is generated at Step A3, the ultrasonic transmission unit 104 sends out an ultrasonic signal which is M-sequence-modulated by the driving signal from the ultrasonic driving circuit 103 from the electronic pen 10 into space (Step A4).

Upon detecting an initial condition of an M sequence, the control circuit 101 instructs the reception trigger driving circuit 105 to generate a reception trigger driving signal. The reception trigger driving circuit 105 generates a reception trigger driving signal based on the instruction signal from the control circuit 101 (Step A5).

The reception trigger transmission unit 106 sends the trigger signal generated by the reception trigger driving signal from the reception trigger driving circuit 105 into space in synchronization with transmission timing of the ultrasonic signal (Step A6).

Next, with reference to the flow chart shown in FIG. 4, description will be made of operation of the data processing circuit 206 of the reception device 20. As a preceding stage of the processing by the data processing circuit 206, the sampling circuit 202 samples ultrasonic signals received at the respective ultrasonic reception units 201-1 and 201-2 at fixed sampling intervals and sequentially stores the sampled waveform data in the memory 205. In this case, waveform data obtained by sampling the ultrasonic signals received by the ultrasonic reception units 201-1 and 201-2 are individually stored in the memory 205.

On the other hand, upon detecting a trigger pulse from the trigger signal received at the reception trigger reception unit 203, the reception trigger detection circuit 204 generates trigger detection time data indicative of a trigger pulse detection time (arrival time) and stores the same in the memory 205.

Figure 4:
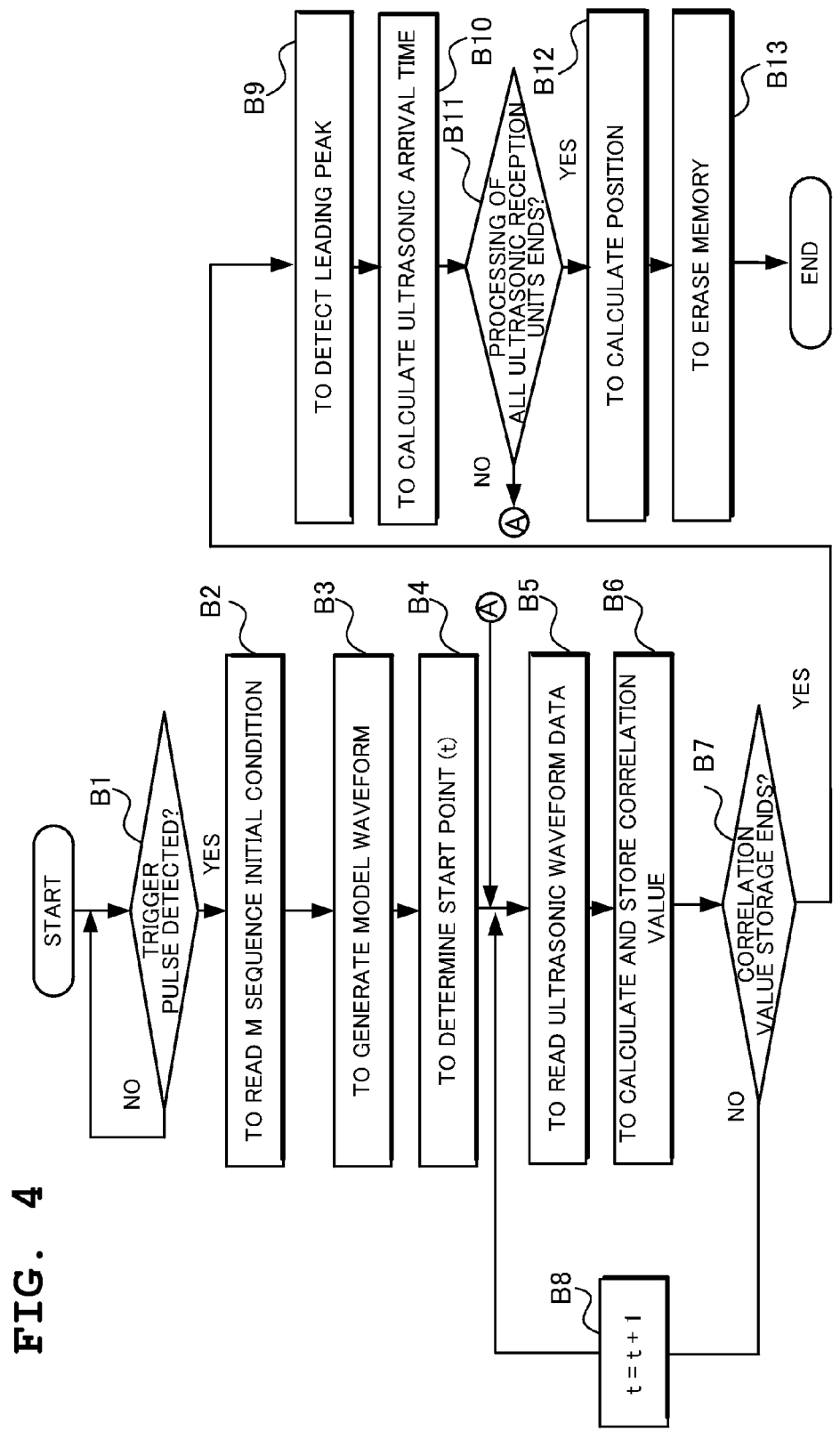
FIG. 4 is a flow chart for use in explaining operation of the reception processing device according to the first exemplary embodiment of the present invention.

In FIG. 4, when the reception trigger detection circuit 204 detects a reception trigger pulse (Step B1), the data processing circuit 206 reads initial condition data of an M sequence which is stored in advance from the memory 205 (Step B2).

Next, the data processing circuit 206 generates an M sequence model waveform of an ultrasonic signal transmitted by using the read M sequence initial condition data and a characteristic polynomial set in advance (Step B3).

Next, set the trigger detection time indicated by the trigger detection time data stored in the memory 205 to be the sampling start time (t) (Step B4) and read the waveform data of the received ultrasonic signal from the memory 205 (Step B5). In addition, the data processing circuit 206 executes filtering with respect to waveform data and considers the filtered waveform data as new waveform data as required.

The data processing circuit 206 calculates a correlation value C(t) at the sampling time (t) between the waveform data of the ultrasonic signal and the previously generated M sequence model waveform by using the following Expression (1) and stores the calculated correlation value C(t) in the memory 205 (Step B6).

(NUMERICAL EXPRESSION 1)

$$C(t) = \frac{1}{N}\sum_{i=0}^{N-1} r(i)f(i+t) \quad (1)$$

In the Expression (1), "i" is an integral value which represents a sampling time variable, "N" represents the number of samplings of a model waveform, "r(i)" represents a value of a model waveform at a sampling time i and "f(i+t)" represents a value of a waveform at a sampling time (i+t).

When not all the correlation values are stored in the memory 205 (Step B7), increment the sampling time t by a unit time of "1" to return to the processing at Step B5.

When calculation and storage of all the correlation values is completed at Step B7 by the repetitious execution of the processing of Steps B5 and B6, detect a leading peak (first peak) from the correlation values stored in the memory 205 (Step B9).

The data processing circuit 206 calculates time of ultrasonic propagation from the electronic pen 10 based on the sampling start time (trigger detection time) set at Step B4 and the leading peak detection time detected at Step B9 (Step B10).

With a sampling time as time when a trigger pulse is detected set to be "0" and a sampling cycle set to be T, the ultrasonic propagation time can be calculated as t×T.

When a peak has a ratio to a maximum peak of a correlation value not less than a fixed ratio, recognizing the peak as a peak of a direct wave enables reliable detection of an arrival time of an ultrasonic signal as a leading (first) direct wave without being affected by a reflected wave.

At Step B11, determine whether processing with respect to the ultrasonic signals received at all the ultrasonic reception units 201-1 and 201-2 is completed or not and when the processing is yet to be completed, repeat the processing of reading waveform data of an ultrasonic signal starting at Step B5.

When the processing with the ultrasonic signals received at all the ultrasonic reception units 201-1 and 201-2 is completed, calculate a position of the electronic pen 10 on the display panel 30 based on the propagation time calculated for each ultrasonic signal received at each of the ultrasonic reception units 201-1 and 201-2 and the interval length between the ultrasonic reception units 201-1 and 201-2 (Step B12). Thereafter, erase the contents of the memory 205 at Step B13.

Example of a position calculation procedure by the data processing circuit 206 will be described in the following.

Figure 5:
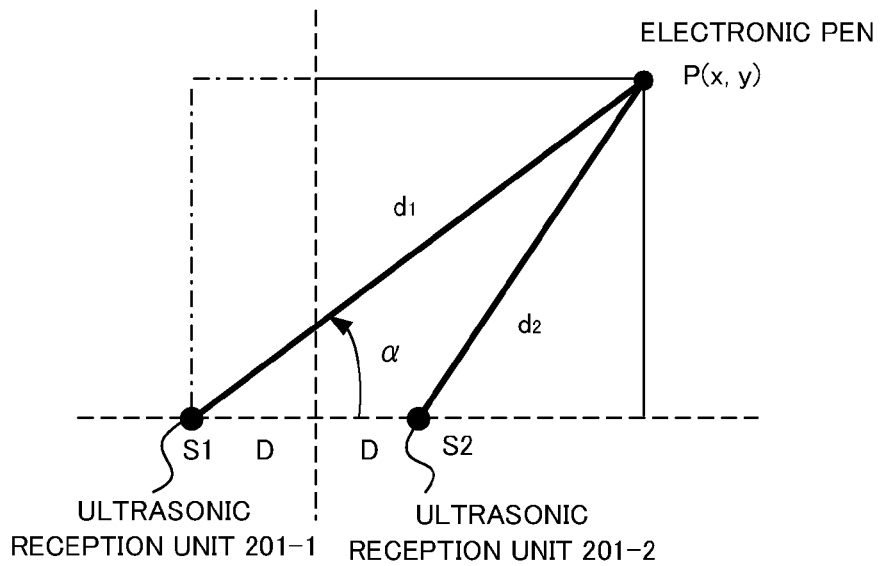
FIG. 5 is a diagram two-dimensionally showing a method of calculating a position of the electronic pen according to the first exemplary embodiment of the present invention.

FIG. 5 is a diagram two-dimensionally showing a method of calculating a position between the electronic pen 10 and the ultrasonic reception units 201-1 and 201-2. In FIG. 5, P represents a position coordinate value (x, y) at coordinates x-y in a drawing range of the electronic pen 10 on the display panel 30 and S1 and S2 represent positions of the ultrasonic reception units 201-1 and 201-2, respectively.

d1 represents a distance from the electronic pen 10 to the ultrasonic reception unit 201-1 and d2 represents a distance from the electronic pen 10 to the ultrasonic reception unit 201-2. D represents a distance from the origin when the center of the ultrasonic reception units 201-1 and 201-2 is set to be the origin of the x-y coordinates. α represents an angle formed by a straight line linking the electronic pen 10 and the ultrasonic reception unit 201-1 and the x-axis.

Here, set the propagation times calculated based on the ultrasonic signals received at the ultrasonic reception units 201-1 and 201-2 to be t1 and t2, respectively, and set a sound velocity to be A.

The distances d1 and d2 can be calculated as d1=A×t1 and d2=A×t2. Since the following Expression (2) holds between an interval length (2D) between the ultrasonic reception units 201-1 and 201-2 and the distances d1 and d2, the position (x, y) of the electronic pen 10 can be obtained by the calculation using the Expression (3).

(NUMERICAL EXPRESSION 2)

$$d_2^2 = (2D)^2 + d_1^2 - 2(2D)d_1\cos\alpha \quad (2)$$
$$\to d_1\cos\alpha = \frac{(2D)^2 + d_1^2 - d_2^2}{4D}$$

(NUMERICAL EXPRESSION 2)

$$x = d_1\cos\alpha - D = \frac{d_1^2 - d_2^2}{4D} \quad (3)$$
$$y = \sqrt{d_1^2 - (x+D)^2}$$

As described above, it will be possible to precisely detect a position of the electronic pen 10 by the principle of trigonometrical survey based on the propagation time of ultrasonic signals received at the two ultrasonic reception units 201-1 and 201-2 of the reception device 20 and the interval length between the ultrasonic reception units 201-1 and 201-2.

By correlating the position of the electronic pen 10 and a display position of the display panel 30 in advance by the foregoing operation, at the time of drawing, while the tip of the electronic pen 10 is being pressed, repetitious transmission of a trigger signal and an ultrasonic signal in a fixed cycle enables loci of a plurality of electronic pens 10 to be sequentially drawn with high precision.

As a mode of implementation, usable as a trigger signal for each electronic pen 10 is an infrared signal whose wavelength is different to an extent that fails to interfere with each other. In this case, the reception trigger reception unit 203 receives a reception trigger of each wavelength to be used. Upon detecting a trigger pulse from the output of the reception trigger reception unit 203, the reception trigger detection circuit 204 stores an arrival time of a trigger pulse of each wavelength corresponding to each electronic pen 10 in the memory 205.

With respect to the ultrasonic signal received at the reception device 20, execute correlation processing by a model waveform of an M sequence assigned to each electronic pen 10 and from an arrival time of the ultrasonic signal detected (trigger pulse detection time) and a time of detection of a leading peak of a correlation value, calculate a propagation time.

As another mode of implementation, it is possible to use, as a trigger signal, an infrared signal of the same wavelength and use a reception trigger pulse signal of a different M sequence for each electronic pen 10. In this case, the reception trigger detection circuit 204 of the reception device 20 detects an arrival time of the reception trigger pulse signal by executing correlation processing by a model waveform of an M sequence for each electronic pen 10.

In the following, with reference to specific waveforms, description will be made of an example of a case where ultrasonic signals from two electronic pens 10-1 and 10-2 are received.

Figure 6:
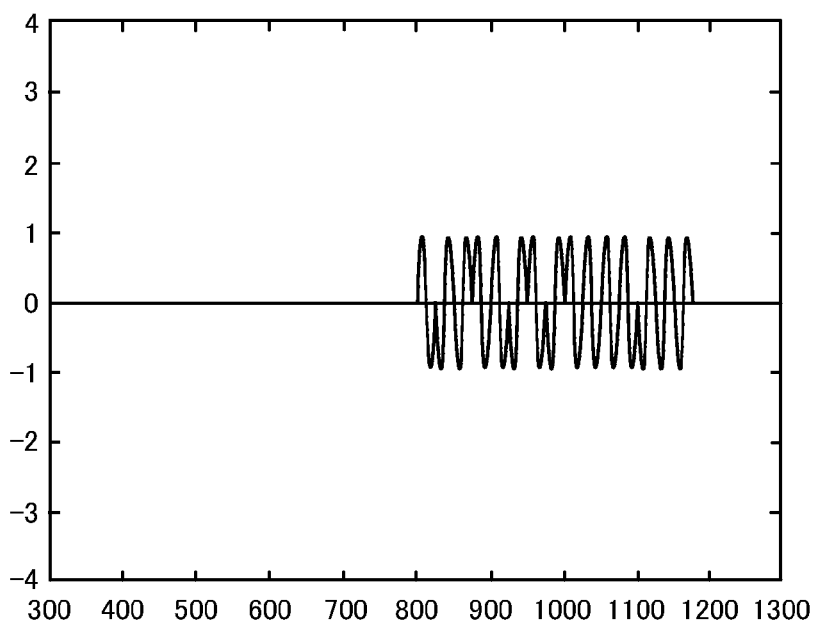
FIG. 6 is a diagram showing an example of an ultrasonic waveform from an electronic pen 10-1 according to the first exemplary embodiment of the present invention.

FIG. 6 shows a waveform of an ultrasonic signal from the electronic pen 10-1 which is obtained by phase-modulating ultrasonic whose frequency is 20 kHz by a 15-bit M sequence data string "100110101111000" which is generated by the above-described quartic characteristic polynomial $f_1(x)=x^4+x+1$. The waveform shown in FIG. 6 is a waveform obtained when an interval of sampling by the sampling circuit 202 is set to be 2 μs. With a time point where a trigger signal of the electronic pen 10-1 is received set to be "0", the abscissa represents an index indicative of time incremented at every 2 μs.

Figure 7:
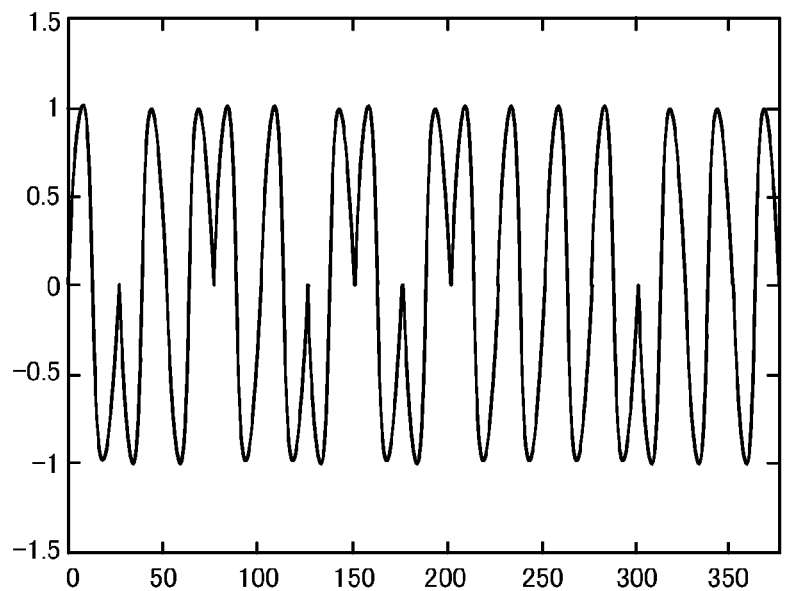
FIG. 7 is a diagram showing an example of an M sequence model waveform of the electronic pen 10-1 generated by the reception processing device according to the first exemplary embodiment of the present invention.

FIG. 7 shows an M sequence model waveform of an ultrasonic signal generated by the data processing circuit 206 of the reception device 20 by the 15-bit M sequence data string "100110101111000" set at the electronic pen 10-1.

Figure 8:
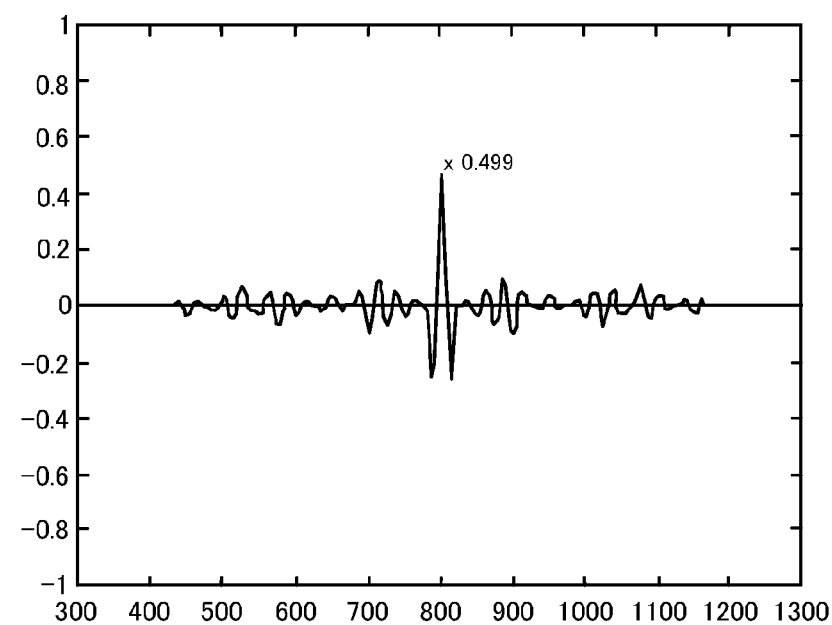
FIG. 8 is a diagram showing an example of a correlation value of the electronic pen 10-1 calculated by a data processing unit of the reception processing device according to the first exemplary embodiment of the present invention.

FIG. 8 shows a correlation value obtained when correlation processing is executed with respect to the waveform shown in FIG. 6 by the M sequence model waveform of the ultrasonic signal shown in FIG. 7. Arrival time of the ultrasonic signal transmitted from the electronic pen 10-1 is detected as time when a correlation value peak is taken. When not a plurality of electronic pens but only one pen is used, an arrival time of ultrasonic is thus detected.

Figure 9:
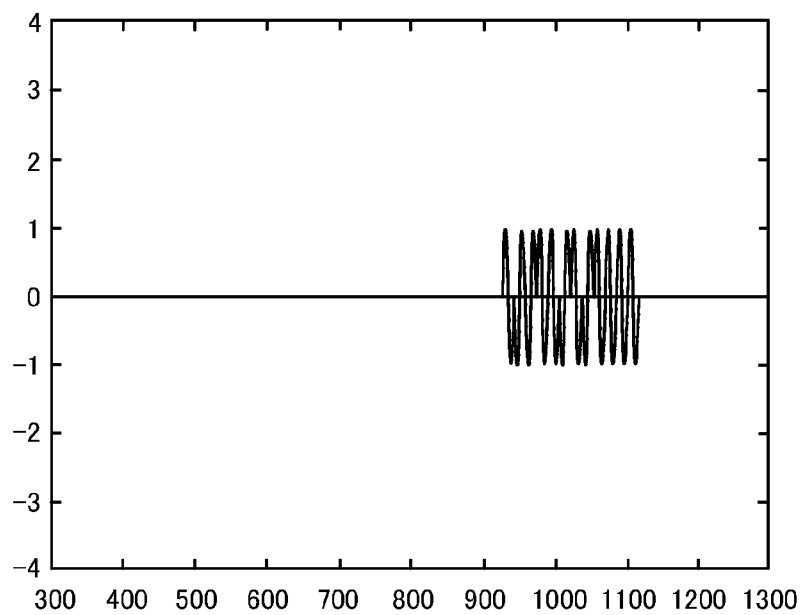
FIG. 9 is a diagram showing an example of an ultrasonic waveform from an electronic pen 10-2 according to the first exemplary embodiment of the present invention.

FIG. 9 shows a waveform of an ultrasonic signal from the electronic pen 10-2 which is obtained by phase-modulating ultrasonic whose frequency is 40 kHz by a 15-bit M sequence data string "101011001000111" generated by the above-described quartic characteristic polynomial $f_2(x)=x^4+x^3+1$ which is different from that of the electronic pen 10-1. The abscissa represents a time point where a trigger signal of the electronic pen 10-2 is received set to be "0", with a sampling interval being 2 μs.

Figure 10:
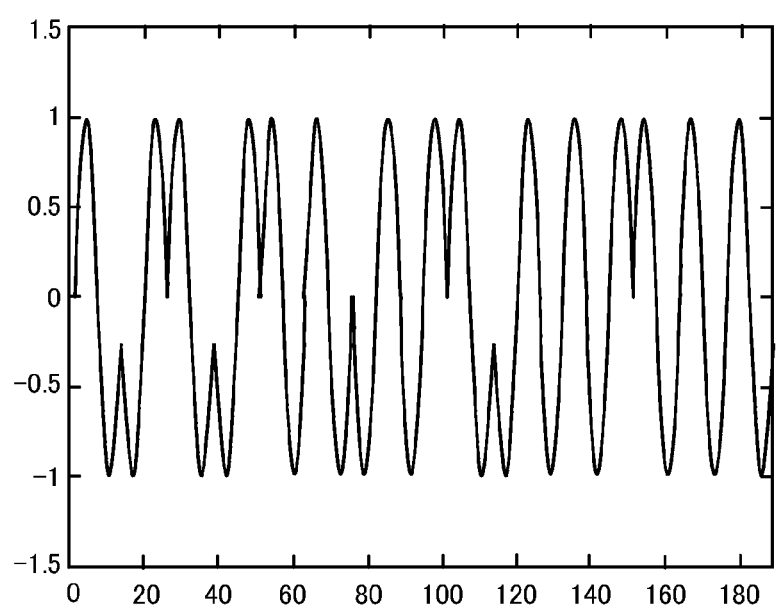
FIG. 10 is a diagram showing an example of an M sequence model waveform of the electronic pen 10-2 generated by the reception processing device according to the first exemplary embodiment of the present invention.

FIG. 10 shows an M sequence model waveform of an ultrasonic signal generated at the data processing circuit 206 of the reception device 20 by the 15-bit M sequence data string "101011001000111" set at the electronic pen 10-2.

Figure 11:
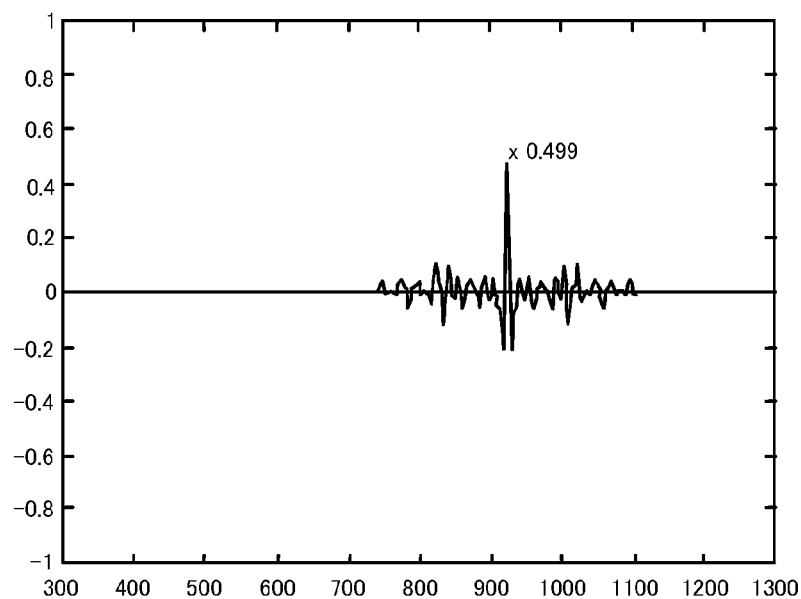
FIG. 11 is a diagram showing an example of a correlation value of the electronic pen 10-2 calculated by the data processing unit of the reception processing device according to the first exemplary embodiment of the present invention.

FIG. 11 shows a correlation value obtained when correlation processing is executed with respect to the waveform shown in FIG. 9 by the M sequence model waveform of the ultrasonic signal shown in FIG. 10. Arrival time of the ultrasonic signal transmitted from the electronic pen 10-2 is detected as time having a correlation value peak.

Figure 12:
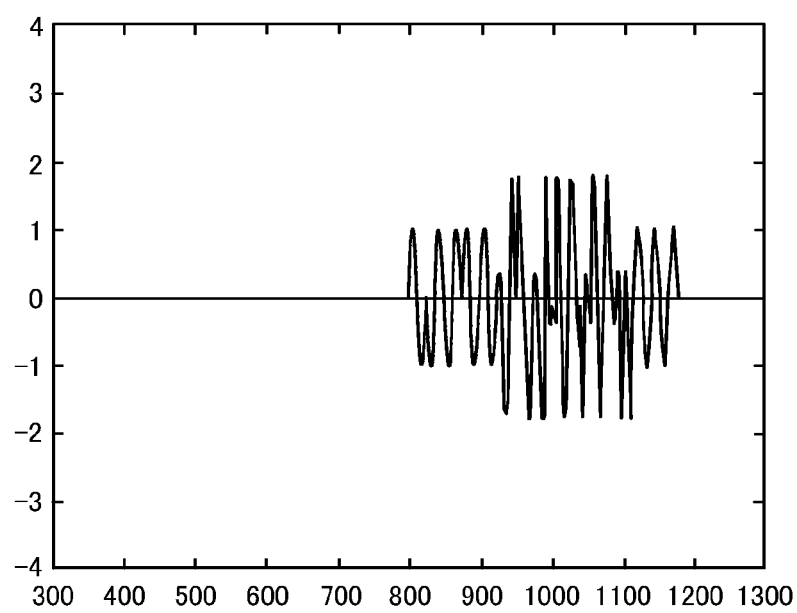
FIG. 12 is a diagram showing an example of an ultrasonic waveform to be stored in a memory of the reception processing device according to the first exemplary embodiment of the present invention.

FIG. 12 shows a waveform of an ultrasonic signal in a case where the electronic pen 10-1 and the electronic pen 10-2 are simultaneously used at substantially the same distance from the reception device 20. The abscissa represents a time point where a trigger signal of the electronic pen 10-1 is received set to be "0", with a sampling interval being 2 μs. The waveform is received as a composite waveform of the waveform of the ultrasonic signal from the electronic pen 10-1 which is shown in FIG. 6 and the waveform of the ultrasonic signal from the electronic pen 10-2 which is shown in FIG. 9.

Figure 13:
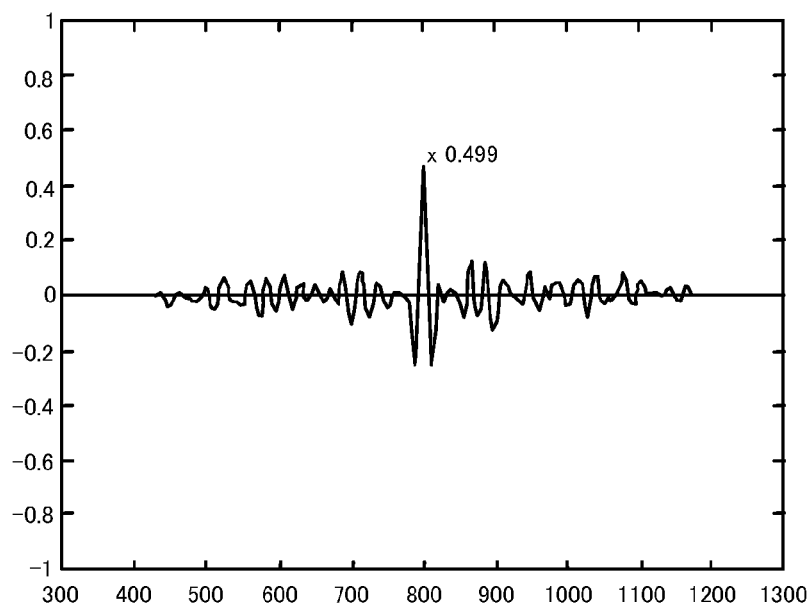
FIG. 13 is a diagram showing an example of a correlation value of the electronic pen 10-1 calculated by the data processing unit of the reception processing device according to the first exemplary embodiment of the present invention.

FIG. 13 shows a correlation value obtained when correlation processing is executed with respect to the waveform shown in FIG. 12 by the M sequence model waveform of the ultrasonic signal shown in FIG. 7. Arrival time of the ultrasonic signal transmitted from the electronic pen 10-1 is detected as a time having a correlation value peak even when ultrasonic transmitted from the electronic pen 10-1 and the electronic pen 10-2 are simultaneously received.

Figure 14:
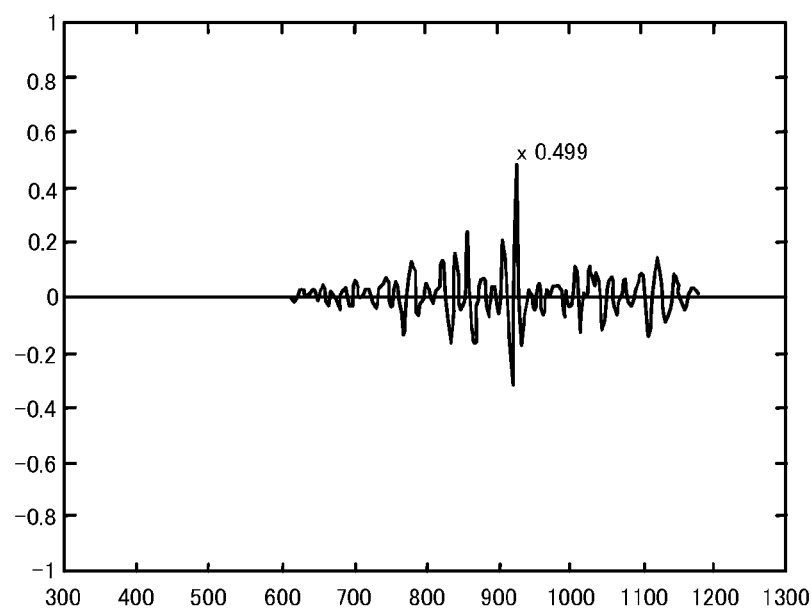
FIG. 14 is a diagram showing an example of a correlation value of the electronic pen 10-2 calculated by the data processing unit of the reception processing device according to the first exemplary embodiment of the present invention.

FIG. 14 shows a correlation value obtained when correlation processing is executed with respect to the waveform shown in FIG. 12 by the M sequence model waveform of the ultrasonic signal shown in FIG. 10. Arrival time of the ultrasonic signal transmitted from the electronic pen 10-2 is similarly detected as a time having a correlation value peak even when ultrasonic transmitted from the electronic pen 10-1 and the electronic pen 10-2 are simultaneously received.

Thus, even when ultrasonic transmitted from a plurality of electronic pens are simultaneously received at the reception device 20, an arrival time can be detected.

Figure 15:
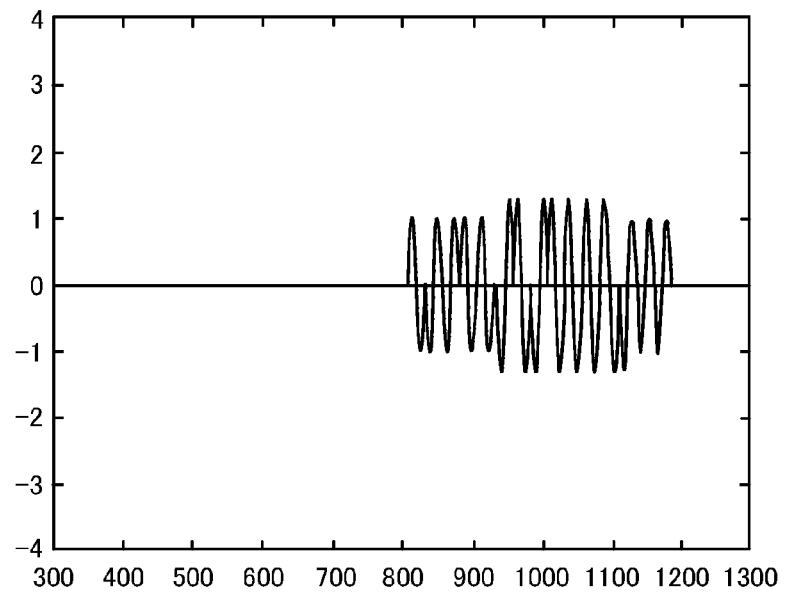
FIG. 15 is a diagram showing an example of an ultrasonic waveform to be stored in the memory of the reception processing device according to the first exemplary embodiment of the present invention.

FIG. 15 shows a waveform of an ultrasonic signal in a case where the ultrasonic signal transmitted from each of the electronic pen 10-1 and the electronic pen 10-2 used at different positions are received at the reception device 20. The abscissa represents a time with a time when a trigger signal of the electronic pen 10-1 is received set to be "0" and with a sampling interval being 2 µs. Since the electronic pen 10-2 is used at a position farther from the reception device 20 than the electronic pen 10-1, the signal level of the transmitted ultrasonic will attenuate according to a distance and the reception level at the reception device 20 will be lower than that of the electronic pen 10-1.

Figure 16:
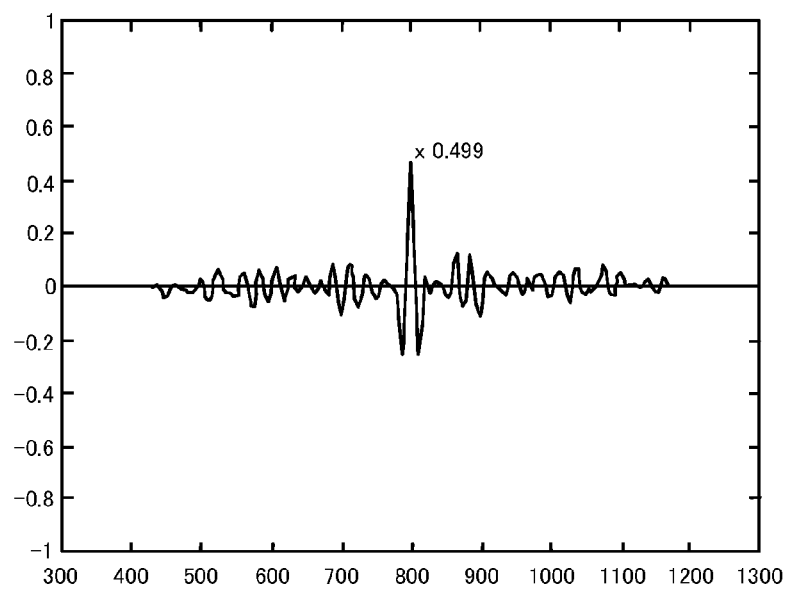
FIG. 16 is a diagram showing an example of a correlation value of the electronic pen 10-1 calculated by the data processing unit of the reception processing device according to the first exemplary embodiment of the present invention.

FIG. 16 shows a correlation value obtained when correlation processing is executed with respect to the waveform shown in FIG. 15 by the M sequence model waveform of the ultrasonic signal shown in FIG. 7. Arrival time of the ultrasonic signal transmitted from the electronic pen 10-1 is detected as time having a correlation value peak.

Figure 17:
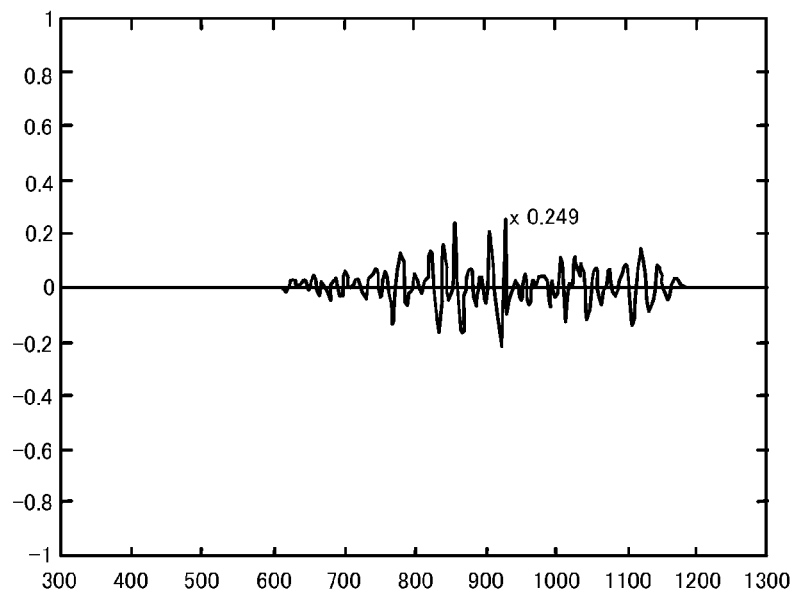
FIG. 17 is a diagram showing an example of a correlation value of the electronic pen 10-2 calculated by the data processing unit of the reception processing device according to the first exemplary embodiment of the present invention.

FIG. 17 shows a correlation value obtained when correlation processing is executed with respect to the waveform shown in FIG. 15 by the M sequence model waveform of the ultrasonic signal shown in FIG. 10. No clear difference is found between a correlation value peak and other peaks. As one example of determination, a ratio of other peaks to the maximum peak is not less than a predetermined threshold value.

Figure 18:
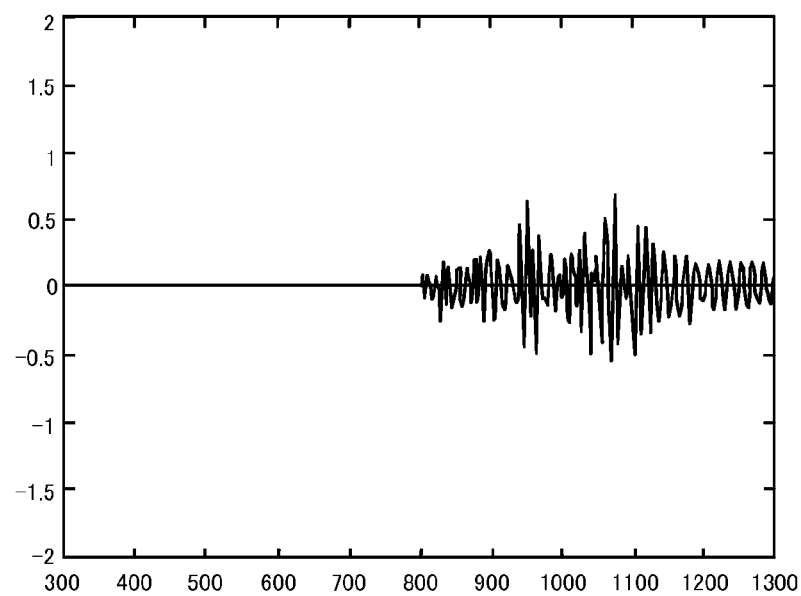
FIG. 18 is a diagram showing a waveform obtained by subjecting the waveform shown in FIGS. 15 to 30 kHz high-pass filtering.

FIG. 18 shows a waveform obtained by subjecting the waveform shown in FIGS. 15 to 30 kHz high-pass filtering.

Figure 19:
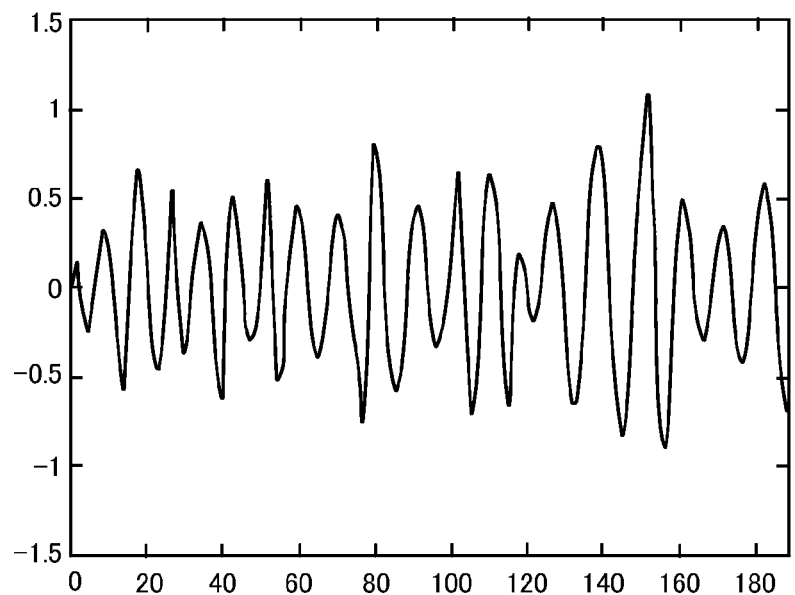
FIG. 19 is a diagram showing a waveform obtained by subjecting the M sequence model waveform of the ultrasonic signal shown in FIGS. 7 to 30 kHz high-pass filtering.

FIG. 19 shows a waveform obtained by similarly subjecting the M sequence model waveform of the ultrasonic signal shown in FIGS. 7 to 30 kHz high-pass filtering.

Figure 20:
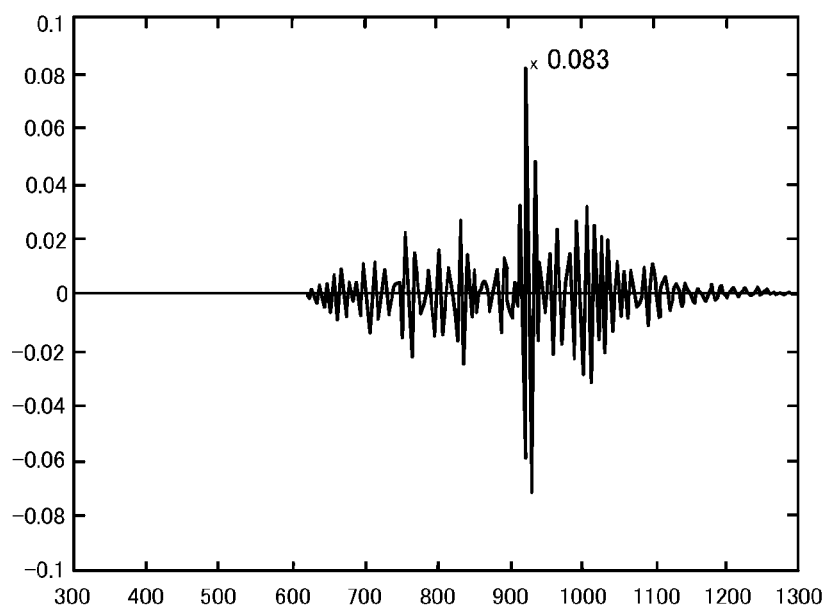
FIG. 20 is a diagram showing a correlation value obtained by correlating the waveform subjected to high-pass filtering which is shown in FIG. 18 with the M sequence model waveform of the ultrasonic signal subjected to high-pass filtering which is shown in FIG. 19.

FIG. 20 shows a correlation value obtained when correlation processing is executed with respect to the waveform subjected to high-pass filtering which is shown in FIG. 18 by the M sequence model waveform of the ultrasonic signal subjected to the high-pass filtering which is shown in FIG. 19. Arrival time of the ultrasonic signal transmitted from the electronic pen 10-2 is detected as time having a correlation value peak.

Thus, ultrasonic transmitted from a plurality of electronic pens after filtering are simultaneously received at the reception device 20, and even when they have different reception levels, an arrival time can be detected.

Figure 21:
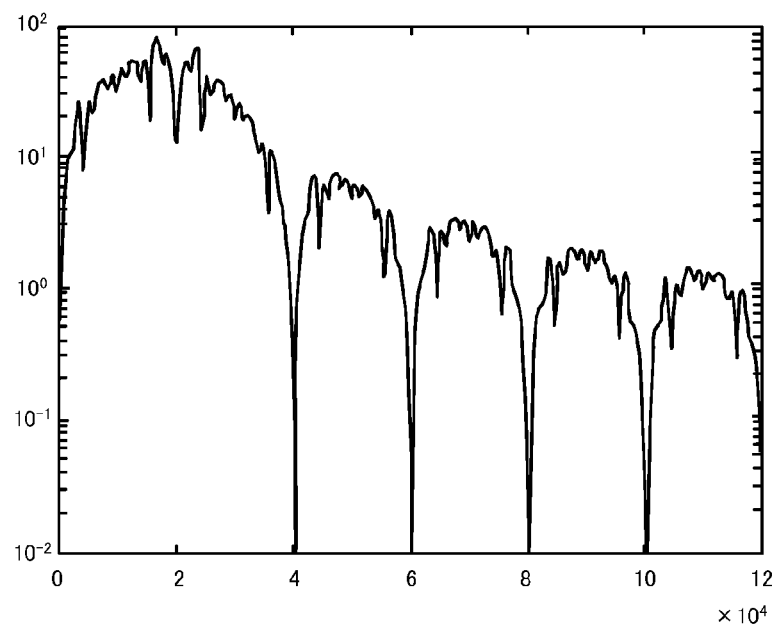
FIG. 21 is a diagram showing a frequency component of the waveform shown in FIG. 6.

FIG. 21 shows a frequency component of the waveform shown in FIG. 6. Main frequency component ranges from 0 to 40 kHz.

Figure 22:
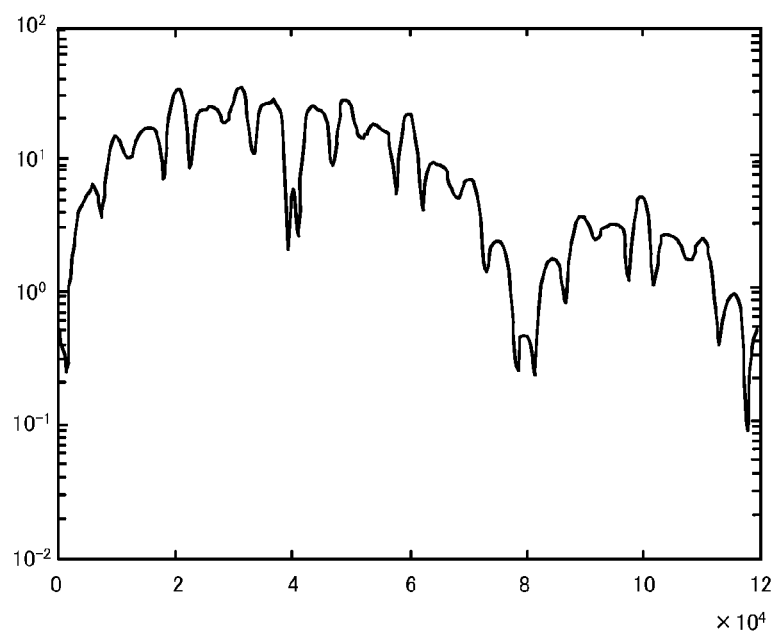
FIG. 22 is a diagram showing a frequency component of the waveform shown in FIG. 9.
Figure 23:
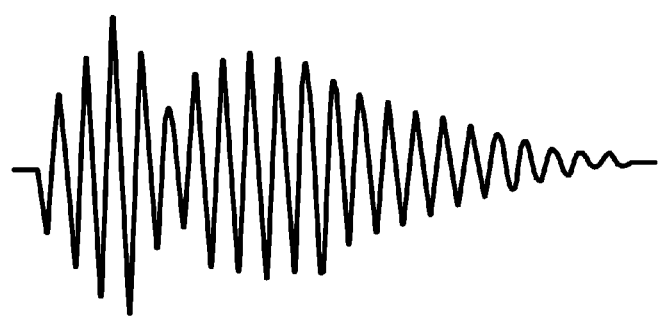
FIG. 23 is a diagram showing an example of an ultrasonic waveform according to the related art.
Figure 24:
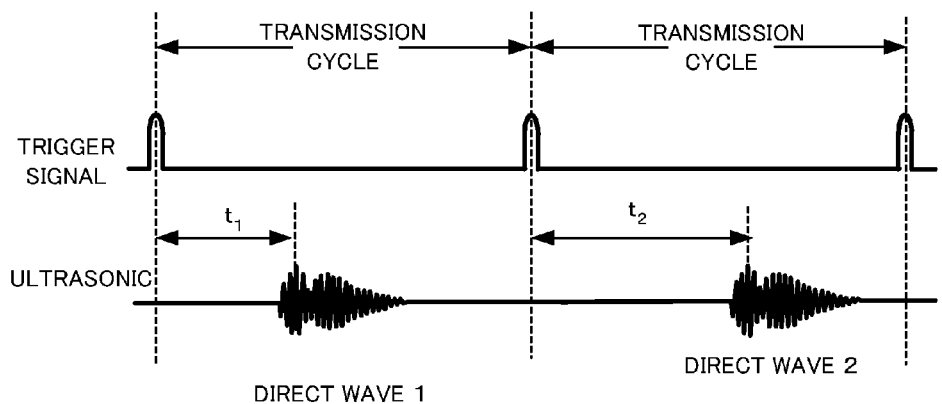
FIG. 24 is a diagram showing examples of a *reception trigger signal and an ultrasonic waveform according to the related art.
Figure 25:
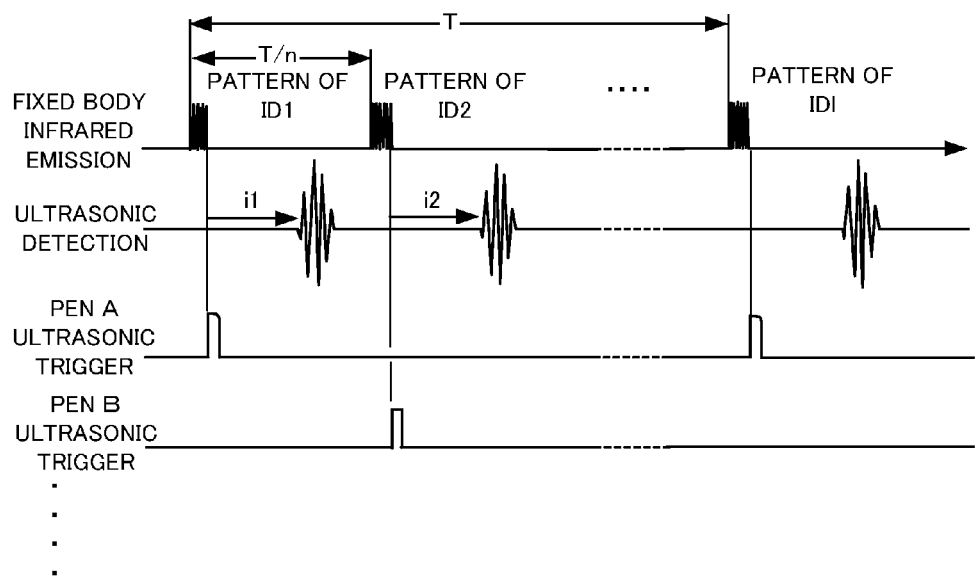
FIG. 25 is a diagram showing examples of a transmission trigger signal and an ultrasonic waveform according to the related art.

FIG. 22 shows a frequency component of the waveform shown in FIG. 9. Main frequency component ranges from 0 to 80 kHz.

Since any of ultrasonic signals has a fixed band enabling identification of characteristics, by appropriately selecting a filter that prevents a loss of a component characterizing each pen, an ultrasonic arrival time can be detected even when a reception level differs. In the above-described case, even if a component less than 30 kHz is lost by 3 kHz high-pass filtering, 30 to 80 kHz components enable detection of the time.

(Effects of the First Exemplary Embodiment)

According to the present exemplary embodiment, in a case where a plurality of electronic pens 10 are used simultaneously, even when a reception level of an ultrasonic signal from each of the electronic pens 10 which is received at the reception unit 200 differs, a position of each electronic pen 10 can be detected by a direct wave arriving first at the reception unit 200 without being affected by the plurality of ultrasonic signals sent from the plurality of electronic pens 10. As a result, when a plurality of electronic pens are used simultaneously, a position of each electronic pen can be detected precisely and stably.

The reason is that by using an ultrasonic signal obtained by modulating different frequency ultrasonic by a different M sequence at the transmission unit 100 of each electronic pen 10 and setting a trigger signal to be an electromagnetic wave signal identifiable for each electronic pen 10, the reception device 20 generates an M sequence model waveform of each electronic pen 10 to calculate a correlation value between the ultrasonic signal in question and the generated M sequence model waveform, detect a first peak of the correlation value and precisely calculate a time of ultrasonic propagation from each electronic pen 10 based on a time of reception of the trigger signal and a time of detection of the correlation peak. Furthermore, the reason is that when no difference is found between a selected peak and the other peaks, by filtering the ultrasonic signal to calculate a correlation value between the ultrasonic signal in question and a similarly filtered M sequence model waveform and detect a first peak of the correlation value, time of ultrasonic propagation from each electronic pen 10 can be precisely calculated based on a time of reception of the trigger signal and a time of detection of the correlation peak in question.

(Second Exemplary Embodiment)

Next, a position detection system according to a second exemplary embodiment of the present invention will be detailed.

In the present exemplary embodiment, ultrasonic signals from a plurality of the electronic pens 10 are transmitted to have such a band that prevents an overlap among the plurality of electronic pens 10. This may be realized by controlling a driving signal from the ultrasonic driving circuit 103 or by limiting a transmission band by the use of the ultrasonic transmission unit 104 that has a desired band characteristic in advance.

The reception device 20 executes filtering of extracting a band for use in each electronic pen 10 with respect to a received ultrasonic signal and calculates a value of correlation of the ultrasonic signal subjected to filtering with an M sequence model waveform similarly subjected to filtering to detect a first peak of the correlation value.

Since entire structure and operation of the position detection system according to the present exemplary embodiment are the same as those of the above-described first exemplary embodiment, no description will be made thereof.

(Effects of the Second Exemplary Embodiment)

Since the present exemplary embodiment is structured such that ultrasonic signals from a plurality of the electronic pens 10 are transmitted to have such a band that prevents an overlap among the plurality of electronic pens 10 and the reception device 20 executes filtering of extracting a band for use in each electronic pen 10, a position of each electronic pen can be detected precisely and stably by securely extracting ultrasonic from each electronic pen from a composite wave formed of ultrasonic received simultaneously from the plurality of electronic pens and detecting an ultrasonic arrival point.

While the present invention has been described with respect to the preferred exemplary embodiments and modes of implementation in the foregoing, the present invention is not necessarily limited to the above-described exemplary embodiments and modes of implementation but can be implemented in variation within the scope of its technical idea.

While in each of the above-described exemplary embodiments, the description has been made of application of the present invention to an electronic pen system, it is also applicable to a robot system. Disposing a transmission device at a robot and disposing a reception device on a ceiling or a wall in a certain space enables a position of the robot in the space to be detected. Grasping the position of the robot in the space allows such use as collision prevention by controlling the robot.

On the other hand, attaching the transmission device to a human body or the like and the reception device to a ceiling or a wall in a certain space allows such use as traffic line detection or position tracing in the space.

In either case, it is possible to set up an environment where a plurality of movable bodies exist by using ultrasonic of a different M sequence for each movable body.

While the description has been so far made of modulation by an M sequence, it is not limited to an M sequence as long as it is a pseudo random signal whose self-correlativity is high and whose cross-correlativity with other sequence is low such as a Gold sequence.

Incorporation By Reference

This application is based upon and claims the benefit of priority from Japanese patent application No. 2009-165412, filed on Jul. 14, 2009, the disclosure of which is incorporated herein in its entirety by reference.

What is claimed is:

1. A position detection system, comprising:
   at least one moving body including a transmission device which simultaneously sends out a trigger signal indicative of transmission timing and an ultrasonic signal obtained by modulating a signal of a frequency as a reference by pseudo random sequence data having high self-correlativity; and
   a reception device which receives said trigger signal and said ultrasonic signal to detect a position of said moving body, wherein
   said reception device comprises
   at least two ultrasonic reception units provided at a predetermined interval which receive said ultrasonic signal,
   a unit which calculates a correlation value between a waveform of said ultrasonic signal and a model waveform of said pseudo random sequence determined in advance according to said moving body, after respectively filtering said waveform of said ultrasonic signal and said model waveform by a same band filter that remains an intrinsic band of each of said at least one moving body,
   a unit which subjects the waveform of said ultrasonic signal and the model waveform of said pseudo random sequence determined in advance according to said moving body to filtering to calculate a correlation value between the two waveforms,
   a unit which detects a first peak of any said correlation value calculated and calculates a time of propagation of each ultrasonic to arrive at each of said two ultrasonic reception units from a time point of reception of said trigger signal and a time point of detection of the correlation peak, and
   a unit which calculates a position of said moving body based on said ultrasonic propagation time calculated and the interval length between said ultrasonic reception units, and wherein
   as said pseudo random sequence, a different sequence whose cross-correlativity is low is used.

2. The position detection system according to claim 1, wherein said trigger signal is an electromagnetic wave signal which enables identification of said transmission device.

3. The position detection system according to claim 2, wherein said trigger signal is a signal whose band is divided to prevent overlap with respect to each said transmission device.

4. The position detection system according to claim 1, wherein
   said trigger signal is an electromagnetic wave signal modulated by a pseudo random signal having high self-correlativity which differs with each said transmission device, and
   said reception device calculates a correlation value between a waveform of a received trigger signal and the model waveform set in advance and detects a top of the trigger signal differing with each said transmission device to generate timing as a start point of an arrival time of the ultrasonic signal.

5. The position detection system according to claim 1, wherein as a pseudo random sequence, an M sequence is used.

6. The position detection system according to claim 1, wherein said moving body is an electronic pen.

7. The position detection system according to claim 1, wherein said moving body is a robot comprising said transmission device.

8. A position detection system, comprising:
   at least one moving body including a transmission device which simultaneously sends out a trigger signal indicative of transmission timing and an ultrasonic signal obtained by modulating a signal of a frequency as a reference by pseudo random sequence data having high self-correlativity and by limiting a band of the signal of a frequency, after modulation; and
   a reception device which receives said trigger signal and said ultrasonic signal to detect a position of said moving body, wherein
   said reception device comprises
   at least two ultrasonic reception units provided at a predetermined interval which receive said ultrasonic signal,
   a unit which subjects a waveform of said ultrasonic signal and a model waveform of said pseudo random sequence determined in advance according to said moving body to filtering to calculate a correlation value between the two waveforms, after respectively filtering said waveform of said ultrasonic signal and said model waveform by a same band filter that remains an intrinsic band of each of said at least one moving body,
   a unit which detects a first peak of said correlation value calculated and calculates a time of propagation of each ultrasonic to arrive at each of said two ultrasonic reception units from a time point of reception of said trigger signal and a time point of detection of the correlation peak, and
   a unit which calculates a position of said moving body based on said ultrasonic propagation time calculated and the interval length between said ultrasonic reception units, and wherein
   as said pseudo random sequence, a different sequence whose cross-correlativity is low is used.

9. A reception device of a position detection system which receives, at said reception device, an ultrasonic signal transmitted from a transmission device to detect a position of said transmission device, comprising:
- a trigger signal reception unit which receives a trigger signal indicative of transmission timing that is transmitted from said transmission device;
- at least two ultrasonic reception units provided at a predetermined interval which receive said ultrasonic signal that is obtained by modulating a signal of a frequency as a reference by a pseudo random signal having high self-correlativity and that is transmitted from said transmission device in synchronization with said trigger signal;
- a unit which calculates a correlation value between a waveform of said ultrasonic signal and a model waveform determined in advance according to said moving body, after respectively filtering said waveform of said ultrasonic signal and said model waveform by a same band filter that remains an intrinsic band of each of said at least one moving body;
- a unit which subjects the waveform of said ultrasonic signal and the model waveform of said pseudo random sequence determined in advance according to said moving body to filtering to calculate a correlation value between the two waveforms;
- a unit which detects a first peak of any said correlation value calculated and calculates a time of propagation of each ultrasonic to arrive at each of said two ultrasonic reception units from a time point of reception of said trigger signal and a time point of detection of the correlation peak; and
- a unit which calculates a position of said moving body based on said ultrasonic propagation time calculated and the interval length between said ultrasonic reception units, wherein
- as a sequence of a pseudo random signal of said ultrasonic signal, a different sequence whose cross-correlativity is low is used.

10. The reception device according to claim 9, wherein
said trigger signal is an electromagnetic wave signal modulated by a pseudo random signal having high self-correlativity which differs with each said transmission device, and which
calculates a correlation value between a waveform of a received trigger signal and a model waveform set in advance and detects a top of the trigger signal differing with each said transmission device to generate timing as a start point of an arrival time of the ultrasonic signal.

11. A reception device of a position detection system which receives, at said reception device, an ultrasonic signal transmitted from a transmission device to detect a position of said transmission device, comprising:
- a trigger signal reception unit which receives a trigger signal indicative of transmission timing transmitted from said transmission device;
- at least two ultrasonic reception units provided at a predetermined interval which receive said ultrasonic signal that is obtained by modulating a signal of a frequency as a reference by a pseudo random signal having high self-correlativity and by limiting a band of the signal of the frequency after modulation and that is transmitted from said transmission device in synchronization with said trigger signal;
- a unit which subjects a waveform of said ultrasonic signal and a model waveform of said pseudo random sequence determined in advance according to said moving body to filtering to calculate a correlation value between the two waveforms, after respectively filtering said waveform of said ultrasonic signal and said model waveform by a same band filter that remains an intrinsic band of each of said at least one moving body;
- a unit which detects a first peak of said correlation value calculated and calculates a time of propagation of each ultrasonic to arrive at each of said two ultrasonic reception units from a time point of reception of said trigger signal and a time point of detection of the correlation peak; and
- a unit which calculates a position of said moving body based on said ultrasonic propagation time calculated and the interval length between said ultrasonic reception units, wherein
- as a sequence of a pseudo random signal of said ultrasonic signal, a different sequence whose cross-correlativity is low is used.

12. A position detection method, wherein
at least one transmission device executes the step of simultaneously transmitting a trigger signal indicative of transmission timing and an ultrasonic signal obtained by modulating a signal of a frequency as a reference by a pseudo random signal having high self-correlativity,
a reception device which receives said trigger signal and said ultrasonic signal to detect a position of said moving body executes the steps of:
- receiving said ultrasonic signal by at least two ultrasonic reception units provided at a predetermined interval;
- calculating a correlation value between a waveform of said ultrasonic signal and a model waveform determined in advance according to said moving body, after respectively filtering said waveform of said ultrasonic signal and said model waveform by a same band filter that remains an intrinsic band of each of said at least one moving body;
- subjecting the waveform of said ultrasonic signal and the model waveform determined in advance according to said moving body to filtering to calculate a correlation value between the two waveforms;
- detecting a first peak of any said correlation value calculated and calculating a time of propagation of each ultrasonic to arrive at each of said two ultrasonic reception units from a time point of reception of said trigger signal and a time point of detection of the correlation peak; and
- calculating a position of said moving body based on said ultrasonic propagation time calculated and the interval length between said ultrasonic reception units, wherein
- as a sequence of a pseudo random signal of said ultrasonic signal sent by said transmission device, a different sequence whose cross-correlativity is low is used.

13. The position detection method according to claim 12, wherein said trigger signal is an electromagnetic wave signal which enables identification of said transmission device.

14. The position detection method according to claim 13, wherein said trigger signal is a signal whose band is divided to prevent overlap with respect to each said transmission device.

15. The position detection method according to claim 13, wherein
said trigger signal is an electromagnetic wave signal modulated by a pseudo random signal having high self-correlativity which differs with each said transmission device, and
said reception device calculates a correlation value between a waveform of a received trigger signal and a model waveform set in advance and detects a top of the trigger signal differing with each said transmission device to generate timing as a start point of an arrival time of the ultrasonic signal.

16. A position detection method, wherein
at least one transmission device executes the step of:
simultaneously transmitting a trigger signal indicative of transmission timing and an ultrasonic signal obtained by modulating a signal of a frequency as a reference by a pseudo random signal having high self-correlativity and by limiting a band of the signal of the frequency after modulation;
a reception device which receives said trigger signal and said ultrasonic signal to detect a position of said moving body executes the steps of:
receiving said ultrasonic signal by at least two ultrasonic reception units provided at a predetermined interval;
subjecting a waveform of said ultrasonic signal and a model waveform determined in advance according to said moving body to filtering to calculate a correlation value between the two waveforms, after respectively filtering said waveform of said ultrasonic signal and said model waveform by a same band filter that remains an intrinsic band of each of said at least one moving body;
detecting a first peak of said correlation value calculated and calculating a time of propagation of each ultrasonic to arrive at each of said two ultrasonic reception units from a time point of reception of said trigger signal and a time point of detection of the correlation peak; and
calculating a position of said moving body based on said ultrasonic propagation time calculated and the interval length between said ultrasonic reception units, wherein
as a pseudo random signal sequence of said ultrasonic signal sent by said transmission device, a different sequence whose cross-correlativity is low is used.

17. A propagation time determination method, wherein
at least one transmission device executes the step of simultaneously transmitting a trigger signal indicative of transmission timing and an ultrasonic signal obtained by modulating a signal of a frequency as a reference by a pseudo random signal having high self-correlativity,
a reception device which receives said trigger signal and said ultrasonic signal to detect a position of said moving body executes the steps of:
receiving said ultrasonic signal by at least two ultrasonic reception units provided at a predetermined interval;
calculating a correlation value between a waveform of said ultrasonic signal and a model waveform determined in advance according to said moving body, after respectively filtering said waveform of said ultrasonic signal and said model waveform by a same band filter that remains an intrinsic band of each of said at least one moving body;
subjecting the waveform of said ultrasonic signal and the model waveform determined in advance according to said moving body to filtering to calculate a correlation value between the two waveforms; and
detecting a first peak of any said correlation value calculated and calculating a time of propagation of each ultrasonic to arrive at each of said two ultrasonic reception units from a time point of reception of said trigger signal and a time point of detection of the correlation peak, wherein
as a sequence of a pseudo random signal of said ultrasonic signal sent by said transmission device, a different sequence whose cross-correlativity is low is used.

18. A propagation time determination method, wherein
at least one transmission device executes the step of:
simultaneously transmitting a trigger signal indicative of transmission timing and an ultrasonic signal obtained by modulating a signal of a frequency as a reference by a pseudo random signal having high self-correlativity and by limiting a band of the signal of the frequency after modulation,
a reception device which receives said trigger signal and said ultrasonic signal to detect a position of said moving body executes the steps of:
receiving said ultrasonic signal by at least two ultrasonic reception units provided at a predetermined interval;
subjecting a waveform of said ultrasonic signal and a model waveform determined in advance according to said moving body to filtering to calculate a correlation value between the two waveforms, after respectively filtering said waveform of said ultrasonic signal and said model waveform by a same band filter that remains an intrinsic band of each of said at least one moving body; and
detecting a first peak of said correlation value calculated and calculating a time of propagation of each ultrasonic to arrive at each of said two ultrasonic reception units from a time point of reception of said trigger signal and a time point of detection of the correlation peak, wherein
as a pseudo random signal sequence of said ultrasonic signal sent by said transmission device, a different sequence whose cross-correlativity is low is used.

* * * * *